(12) United States Patent
Amei

(10) Patent No.: US 7,027,313 B2
(45) Date of Patent: Apr. 11, 2006

(54) CONSTANT VOLTAGE OUTPUT CONTROL METHOD AND CONSTANT VOLTAGE OUTPUT CONTROL DEVICE FOR SWITCHING POWER SUPPLY CIRCUIT

(75) Inventor: Toshihiro Amei, Toyama (JP)

(73) Assignee: SMK Corporation, Tokyo (JP)

( * ) Notice: Subject to any disclaimer, the term of this patent is extended or adjusted under 35 U.S.C. 154(b) by 158 days.

(21) Appl. No.: 10/794,567

(22) Filed: Mar. 4, 2004

(65) Prior Publication Data
US 2004/0183507 A1    Sep. 23, 2004

(30) Foreign Application Priority Data
Mar. 18, 2003   (JP)   .............................. 2003-074368

(51) Int. Cl.
*H02M 3/335*     (2006.01)

(52) U.S. Cl. ................... 363/21.12; 363/97; 363/21.01

(58) Field of Classification Search ............. 363/21.12, 363/21.4, 97, 56.09, 18–20; 323/282, 284
See application file for complete search history.

(56) References Cited

U.S. PATENT DOCUMENTS

| | | | | |
|---|---|---|---|---|
| 4,646,218 A | * | 2/1987 | Scholer | .................... 363/21.08 |
| 5,412,555 A | * | 5/1995 | Uramoto | ..................... 363/18 |
| 5,581,453 A | * | 12/1996 | Ueta et al. | ..................... 363/49 |
| 5,661,642 A | * | 8/1997 | Shimashita | .............. 363/21.15 |
| 5,812,383 A | * | 9/1998 | Majid et al. | ............. 363/21.05 |

FOREIGN PATENT DOCUMENTS

JP        2002-136116 A1    5/2002

OTHER PUBLICATIONS

Patent Abstracts of Japan for JP2002-136116 published on May 10, 2002.

* cited by examiner

*Primary Examiner*—Rajnikant B. Patel
(74) *Attorney, Agent, or Firm*—Darby & Darby

(57) ABSTRACT

The present invention provides a constant voltage output control method and a constant voltage output control device for a switching power supply circuit that allow accurate execution of a constant voltage control of an output voltage, even if there is variation in a utilized circuit element or an integrated circuit. A set voltage $V_{2aset}$ is obtained based on equation (1), $$V_{2ASET} = NP \div NS \times V_{2BSET} \tag{1}$$

where, $V_{2bset}$ represents an output voltage of a secondary output winding that is subject to the constant voltage control, Np represents a number of turns of a primary winding, and Ns represents a number of turns of the secondary output winding; and the set voltage $V_{2aset}$ is compared with a flyback voltage $V_{2a}$ of the primary winding.

24 Claims, 8 Drawing Sheets

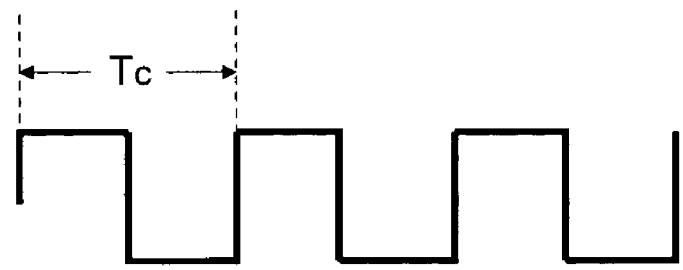
FIG. 7(a)
FIG. 7(b)
FIG. 7(c)
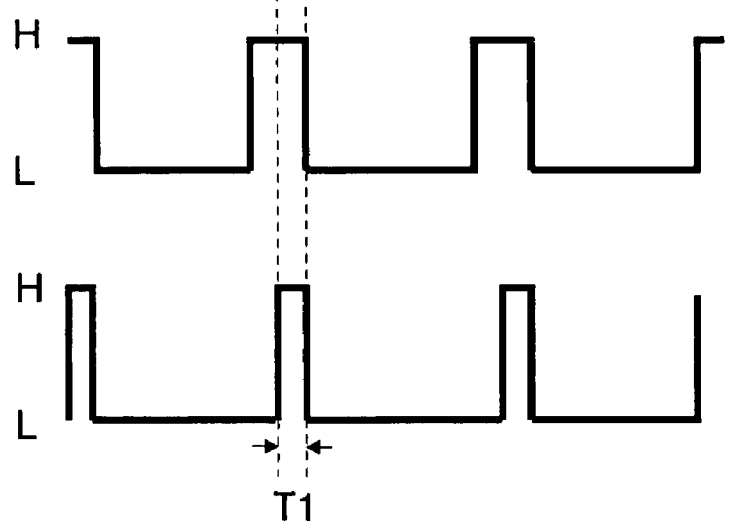
FIG. 7(d)
FIG. 7(e)

CONSTANT VOLTAGE OUTPUT CONTROL METHOD AND CONSTANT VOLTAGE OUTPUT CONTROL DEVICE FOR SWITCHING POWER SUPPLY CIRCUIT

INCORPORATION BY REFERENCE

The present application claims priority under 35 U.S.C. §119 to Japanese Patent Application No. 2003-074368 filed on Mar. 18, 2003. The content of the application is incorporated herein by reference in its entirety.

FIELD OF THE INVENTION

The present invention relates to a constant voltage output control method and a constant voltage output control device that executes a constant voltage control of an output voltage from a secondary side of a transformer of a switching power supply circuit.

BACKGROUND OF THE INVENTION

In a switching power supply circuit, an exciting current is fed to a primary winding of a transformer thus causing energy stored in the transformer to be discharged as an output of a secondary output winding. The switching power supply circuit offers a stable power supply that is compact, lightweight and highly efficient, and is therefore utilized in power supply circuits such as those in battery chargers, AC adapters, and the like.

Conventionally, in this type of switching power supply circuit, an output voltage and current of a rectifying smoothing circuit of a secondary side are monitored such that excessively high power is not output from the rectifying smoothing circuit of the secondary side. The monitoring results are transmitted to a primary side using an insulated signal transmission element such as a photocoupler. On the primary side, an oscillating switching device is controlled so as to switch to ON and OFF in accordance with the transmission signal. Constant voltage control of the output voltage is executed by controlling an ON period (an energized period) and an OFF period of the exciting current fed to the primary winding (as in Japanese Patent Laid-Open Publication No. 2002-136116).

Hereinafter, a constant voltage control of the output voltage executed by a conventional switching power supply circuit 100, like the one described above, will be explained with reference to a circuit diagram shown in FIG. 8.

A direct current power supply 1 is an unstable power supply configured from a high voltage side terminal 1a and a low voltage side terminal 1b. A transformer 2 is configured from a primary winding 2a and a secondary output winding 2b. An oscillating switching device 3 is formed from a field effect transistor. Further, an Ip detection resistor 22 detects a primary winding current Ip that flows in the primary winding 2a. The oscillating switching device 3 is connected between an end of the primary winding 2a, and the low voltage side terminal 1b via the Ip detection resistor 22. The oscillating switching device 3 is switched ON and OFF with a predetermined cycle, by a switching control circuit 101 that is connected to a gate. Accordingly, the entire switching power supply circuit 100 oscillates.

A rectifying diode 4 and a smoothing capacitor 13, which are shown in a secondary side output of the transformer 2, configure a rectifying smoothing circuit. The diode 4 and the smoothing capacitor 13 rectify and smooth an output of the secondary output winding 2b, which is then output between the high voltage side output line 20a and a low voltage side output line 20b. An output monitoring circuit is provided between the output lines 20a and 20b. This output monitoring circuit monitors the output voltage and the output current and is configured from a voltage monitoring circuit and a current monitoring circuit. In the case that either the output voltage or the output current exceeds a respective predetermined reference voltage and reference current, the output monitoring circuit causes a photo coupler light-emitting device 35a, shown in the drawing, to emit light.

In the voltage monitoring circuit, voltage dividing resistors 30 and 31 are connected in series between the high voltage side output line 20a and the low voltage side output line 20b. A divided voltage of an output voltage is obtained from an intermediate tap point 32 and is inputted to an inverted input terminal of a differential amplifier 33a. Further, a voltage monitoring reference supply 34a is connected between a non-inverted input terminal of the differential amplifier 33a and the low voltage side output line 20b, and inputs a first comparative voltage to the non-inverted input terminal for comparison with the divided voltage of the output voltage. A reference voltage is set to a selected value by changing respective resistance values of the voltage dividing resistors 30 and 31, or the first comparative voltage of the voltage monitoring reference supply 34a.

The photo coupler light-emitting device 35a is connected to an output side of the differential amplifier 33a. Further, the photo coupler light-emitting device 35a is connected to the high voltage side output line 20a via an electrical resistor 36, and is supplied with current from the drive power supply.

Moreover, a current detection resistor 43 is disposed in the low voltage side output line 20b in the current monitoring circuit, and one end of the current detection resistor 43 is connected to the inverted input terminal of the differential amplifier 33, and the other end is connected to the non-inverted input terminal via a current monitoring reference supply 34b.

Accordingly, an output current that flows in the low voltage side output line 20b is indicated by a potential difference between both ends of the current detection resister 43. It can be determined whether this output current exceeds the predetermined reference current by comparison with a second comparative voltage of the current monitoring reference supply 34b in a differential amplifier 33b. A reference current is set to a selected value by changing a resistance value of the current detection resistor 43, or the second comparative voltage of the voltage monitoring reference supply 34b. An output side of the differential amplifier 33b is connected to a connection point of the output side of the differential amplifier 33a for monitoring the output voltage and the photo coupler light-emitting device 35a.

Furthermore, the resistor 37a and the capacitor 38a, and the resistor 37b and the capacitor 38b, which are respectively connected in-series, act as alternating current negative feedback devices that cause operation of the differential amplifier 33a and the differential amplifier 33b, respectively, to be stable.

At the primary side of the transformer 2, a photo coupler light-receiving device 35b photo coupling with the photo coupler light-emitting device 35a is connected between the switching control circuit 101 and the low voltage side terminal 1b of the direct current power supply 1.

The switching control circuit 101 incorporates a variable reference supply 101a that outputs a variable voltage in accordance with a collector current of the photo coupler light-receiving device 35b that is configured from a phototransistor; a comparator 101b; an oscillator 101c; and an AND gate 101d.

An inverted input of the comparator 101b is connected to a connection point of the oscillating switching device 3 and the Ip detection resistor 22, and a non-inverted input of the comparator 101b is connected to the variable reference supply 101a. Accordingly, a voltage by the Ip detection resistor 22a represented current Ip which flows in the primary winding 2a and a voltage output from the variable reference supply 101a represented light amount of a limit signal received by the photo coupler light-receiving device 35b from the photo coupler light-emitting device 35a are compared.

An output of the comparator 101b is input to the AND gate 101d along with an output of the oscillator 101c. Further, an output of the AND gate 101d is connected to a gate of the oscillating switching device 3.

With regard to the operation of the switching power supply circuit 100 configured in this way, when the variable reference supply 101a does not receive collector current from the photo coupler light-emitting device 35a, namely, in a normal operating state where the output is stable, a reference voltage Vset set to a predetermined value from the variable reference supply 101a is output to the non-inverted input of the comparator 101b.

On the other hand, the voltage of the Ip detection resistor 22 that indicates the current Ip that flows in the primary winding 2a is input to the inverted input of the comparator 101b. The reference voltage Vset is compared to a primary winding current Ip that increases with the elapse of time once the oscillating switching device 3 has been switched to ON. Accordingly, the comparator 101b outputs "H" until the voltage indicating the primary winding current Ip reaches the reference voltage Vset, and then outputs "L" once the reference voltage Vset has been exceeded.

The oscillator 101c outputs a clock pulse that accords with an oscillation period T of the switching power supply circuit 100 to the AND gate 101d. As a result, the AND gate 101d outputs "H" when the clock pulse is "H" and the output of the comparator 101b is "H", namely, when the voltage that indicates the primary winding current Ip has not reached the reference voltage Vset, and controls the oscillating switching device 3 to switch ON.

In contrast to this, when the output current increases past the reference current due to load connected between the high voltage side line 20a and the low voltage side line 20b, the voltage input to the inverted input terminal of the differential amplifier 33b rises. Thus, the potential difference between this voltage and the second comparative voltage is inverted and amplified, and reaches a potential that exceeds a light-emitting threshold value of the photo coupler light-emitting device 35a.

Furthermore, even when the output voltage increases past the reference voltage due to load connected between the high voltage side line 20a and the low voltage side line 20b, the divided voltage input to the inverted input terminal of the differential amplifier 33b also rises. Thus, the potential difference between this voltage and the first comparative voltage is inversely amplified, and reaches a potential that exceeds the light-emitting threshold value of the photo coupler light-emitting device 35a.

Accordingly, when either one of the output voltage and the output current exceeds the respective reference voltage or reference current, the photo coupler light-emitting device 35a emits a limit signal of an emitted light amount to the photo coupler light-receiving device 35b, in accordance with the respective exceeded amount.

When the photo coupler light-receiving device 35b receives the limit signal from the photo coupler light-emitting device 35a, the output voltage of the variable reference supply 101a reduces from the reference voltage Vset in accordance with the increase in the received light amount. Thus, the output of the comparator 101b is rapidly switched to "L", as compared to the normal operation in which the reference voltage Vset is output.

As a result, the oscillating switching device 3 is switched on, a time T1 for which the primary winding 2a is excited is made shorter, and the energy stored in the transformer 2 reduces within one oscillation period. Accordingly, the output voltage or the output current, which respectively exceed the reference voltage or the reference current, spontaneously reduce, and become equal to or less than the reference voltage or the reference current.

Then, the photo coupler light-emitting device 35a stops emitting light and the photo coupler light-receiving device 35b no longer receives the limit signal. Accordingly, the oscillating switching device 3 once again repeats oscillation that is controlled according to the reference voltage Vset, and a stable output that accords with the power supplied to the load can be obtained.

In order for a voltage to be controlled to a constant by the constant voltage output control method, the switching power supply circuit 100 is provided with voltage dividing resistors 30 and 31 and a voltage monitoring reference supply 34a in a voltage monitoring circuit; a variable reference supply 101a that outputs a reference voltage $V_{set}$ in a switching control circuit 101; and an Ip detection resistor 22 that is in-series with a primary winding 2a. However, as a result of variation of circuit constants of these circuit devices, variation of the integrated circuit itself when the switching control circuit 101 acts as an integrated circuit, and the like, a problem arises since stable and simple mass production of products having highly accurate constant voltage output characteristics is difficult.

Further, in case various output voltage characteristics of the switching power supply circuit are required, it becomes necessary to set each of the aforementioned circuit constants, and the like, or necessary to exchange circuit components, to adjust the characteristics. Accordingly, costs are increased due to factors such as an increase in time spent on intricate design and circuit component adjustment.

Moreover, an output voltage detection circuit is provided at a secondary side of a transformer 2. As a result, the number of components in the circuit is increased, thereby causing the overall circuit to become larger.

In addition, increase in the output voltage detected by the output voltage detection circuit of the secondary side of the transformer 2 is adjusted by control of the primary side. Accordingly, it is necessary to provide a photocoupler light-emitting device 35a, a photocoupler light-receiving device 35b, and so on, which leads to an increase in cost, as well as the circuit configuration becoming more complicated.

SUMMARY OF THE INVENTION

In light of the aforementioned circumstances, it is an object of the present invention to provide a constant voltage output control method and a constant voltage output control device for a switching power supply circuit. This constant voltage output control method and device are capable of accurately executing constant voltage control of an output voltage, even if there is variation of a utilized circuit element or an integrated circuit.

In addition, a further object of the present invention is to provide a constant voltage output control method and a constant voltage output control device for a switching power supply circuit that allow mass production of switching power supply circuits having different output voltage specifications, using the same circuit components.

Moreover, a further object of the present invention is to provide a constant voltage output control method and a constant voltage output control device for a switching power supply circuit that execute a constant voltage control of a constant voltage using only a primary side of a circuit. Accordingly, an output voltage detection circuit on the secondary side, an optically coupled device, and the like, do not need to be provided.

In order to address the above described problems, according to the present invention, even if there is variation of circuit constants of respective circuit devices, it is possible to execute constant voltage control such that an output voltage $V_{2b}$ of a secondary output winding or an output voltage $V_{2o}$ of a rectifying smoothing circuit are accurately set to predetermined set output voltages $V_{2bset}$ and $V_{2oset}$, respectively, simply by adjusting a set voltage $V_{2aset}$, or $V_{2oset}$. Accordingly, it is possible to mass produce a switching power supply circuit which can easily accommodate specifications changes, and which has consistent quality.

Moreover, a value of primary winding current Ip is indicated by a voltage drop $V_{ip}$ that is a voltage. Accordingly, it is easily possible to execute comparison with the set voltage $V_{2aset}$, or the like, that is subject to the constant voltage control by using a comparator circuit including a comparator, without executing calculation processing.

In addition, it is possible to execute constant voltage control of the secondary side using just the primary side. Accordingly, an output voltage detection circuit, an optically coupled device, or the like, do not need to be provided at the secondary side of the transformer.

According to an aspect of the present invention, a constant voltage output control method for a switching power supply circuit having a transformer provided with a primary winding and a secondary output winding; an oscillating switching device which is connected in-series with the primary winding to a direct current power supply that excites the primary winding; a switching control circuit that executes ON/OFF control of the oscillating switching device; and a rectifying smoothing circuit that rectifies and smoothes an output of the secondary output winding; this constant voltage output control method executing a constant voltage control of an output voltage $V_{2b}$ that is generated in the secondary output winding by changing an ON time T1 of the oscillating switching device of the switching power supply circuit, comprising the steps of:

deriving a set voltage $V_{2aset}$ based on equation (1), $$V_{2aset}=Np \div Ns \times V_{2bset} \qquad (1)$$

where, $V_{2bset}$ represents an output voltage of the secondary output winding that is subject to the constant voltage control, Np represents a number of turns of the primary winding, and Ns represents a number of turns of the secondary output winding;

comparing the set voltage $V_{2aset}$ with a flyback voltage $V_{2a}$ of the primary winding; and executing at least one of a time shortening control and a time lengthening control such that, in the case that the flyback voltage $V_{2a}$ is more than the set voltage $V_{2aset}$, the time shortening control is executed that shortens the ON time T1 of the oscillating switching device in accordance with a difference voltage dV between the set voltage $V_{2aset}$ and the flyback voltage $V_{2a}$, and in the case that the flyback voltage $V_{2a}$ is less than the set voltage $V_{2aset}$, the time lengthening control is executed that lengthens the ON time T1 of the oscillating switching device in accordance with the difference voltage dV.

If the output voltage $V_{2bset}$ of the secondary output winding that is subject to the constant voltage control is substituted into Equation (1), the set voltage $V_{2aset}$ for setting the output voltage $V_{2b}$ to a constant voltage is obtained.

In the case that a flyback voltage $V_{2a}$ of the primary winding that is actually generated is more than the set voltage $V_{2aset}$, an ON time T1 is shortened in accordance with a difference voltage dV there between, whereby energy stored in the transformer is reduced during one time cycle such that the flyback voltage $V_{2a}$ is reduced so as to approach the set voltage $V_{2aset}$.

Moreover, in the case that the flyback voltage $V_{2a}$ of the primary winding is less than the set voltage $V_{2aset}$, the ON time T1 is lengthened in accordance with the difference voltage dV there between, whereby energy stored in the transformer is increased during one time cycle such that the flyback voltage $V_{2a}$ is increased so as to approach the set voltage $V_{2aset}$.

As a result, the output voltage $V_{2b}$ of the secondary output winding is controlled so as to become the set output voltage $V_{2bset}$.

According to another aspect of the present invention, a constant voltage output control method for a switching power supply circuit having a transformer provided with a primary winding and a secondary output winding; an oscillating switching device which is connected in-series with the primary winding to a direct current power supply that excites the primary winding; a switching control circuit that executes ON/OFF control of the oscillating switching device; and a rectifying smoothing circuit that rectifies and smoothes an output of the secondary output winding; this constant voltage output control method executing a constant voltage control of an output voltage $V_{2o}$ of the rectifying smoothing circuit by changing an ON time T1 of the oscillating switching device of the switching power supply circuit, comprising the steps of:

deriving a set voltage $V_{2aset}'$ based on equation (2), $$V_{2aset}'=V_{2oset} \times Np \div Ns \div (1-T2 \times k \div Ls) \qquad (2)$$

where, $V_{2oset}$ represents an output voltage of the rectifying smoothing circuit that is subject to the constant voltage control, Np represents a number of turns of the primary winding, Ns represents a number of turns of the secondary output winding, Ls represents an inductance of the secondary output winding, T2 represents an output time for which output is generated in the rectifying smoothing circuit within an oscillation time cycle Tc, and k represents a proportionality constant provided dividing a forward voltage drop of a diode of the rectifying smooth circuit by an output current;

comparing the set voltage $V_{2aset}'$ with a flyback voltage $V_{2a}$ of the primary winding; and executing at least one of a time shortening control and a time lengthening control such that, in the case that the flyback voltage $V_{2a}$ is more than the set voltage $V_{2aset}'$, the time shortening control is executed that shortens the ON time T1 of the oscillating switching device in accordance with a difference voltage dV between the set voltage $V_{2aset}'$ and the flyback voltage $V_{2a}$, and in the case that the flyback voltage $V_{2a}$ is less than the set voltage $V_{2aset}'$, the time lengthening control is executed that lengthens the ON time T1 of the oscillating switching device in accordance with the difference voltage dV.

If the output voltage $V_{2oset}$ of the rectifying smoothing circuit that is subject to the constant voltage control is substituted into Equation (2), the set voltage $V_{2aset}'$ for setting the output voltage $V_{2o}$ to a constant voltage is obtained.

In the case that a generated flyback voltage $V_{2a}$ of the primary winding is more than the set voltage $V_{2aset}'$, an ON time T1 is shortened in accordance with a difference voltage dV there between, whereby energy stored in the transformer is reduced during one time cycle such that the flyback voltage $V_{2a}$ is reduced so as to approach the set voltage $V_{2aset}'$.

Moreover, in the case that the flyback voltage $V_{2a}$ of the primary winding is less than the set voltage $V_{2aset}'$, the ON time T1 is lengthened in accordance with the difference voltage dV there between, whereby energy stored in the transformer is increased during one time cycle such that the flyback voltage $V_{2a}$ is increased so as to approach the set voltage $V_{2aset}'$.

As a result, the output voltage $V_{2o}$ of the rectifying smoothing circuit is accurately controlled so as to become the set output voltage $V_{2oset}$.

According to a further aspect of the present invention, a constant voltage output control method for a switching power supply circuit having a transformer provided with a primary winding and an auxiliary winding on a primary side and a secondary output winding on a secondary side; an oscillating switching device which is connected in-series with the primary winding to a direct current power supply that excites the primary winding; a switching control circuit that executes ON/OFF control of the oscillating switching device; and a rectifying smoothing circuit that rectifies and smoothes an output of the secondary output winding; this constant voltage output control method executing a constant voltage control of an output voltage $V_{2b}$ that is generated in the secondary output winding by changing an ON time T1 of the oscillating switching device of the switching power supply circuit, comprising the steps of:

deriving a set voltage $V_{2cset}$ based on equation (3), $$V_{2cset}=Nt \div Ns \times V_{2bset} \quad (3)$$

where, $V_{2bset}$ represents an output voltage of the secondary output winding that is subject to the constant voltage control, Nt represents a number of turns of the auxiliary winding, and Ns represents a number of turns of the secondary output winding;

comparing the set voltage $V_{2cset}$ with a flyback voltage $V_{2c}$ of the auxiliary winding; and executing at least one of a time shortening control and a time lengthening control such that, in the case that the flyback voltage $V_{2c}$ is more than the set voltage $V_{2cset}$, the time shortening control is executed that shortens the ON time T1 of the oscillating switching device in accordance with a difference voltage dV between the set voltage $V_{2cset}$ and the flyback voltage $V_{2c}$, and in the case that the flyback voltage $V_{2c}$ is less than the set voltage $V_{2cset}$, the time lengthening control is executed that lengthens the ON time T1 of the oscillating switching device in accordance with the difference voltage dV.

If the output voltage $V_{2bset}$ of the secondary output winding that is subject to the constant voltage control is substituted into Equation (3), a set voltage $V_{2cset}$ for setting the output voltage $V_{2b}$ to a constant voltage is obtained.

In the case that a generated flyback voltage $V_{2c}$ of an auxiliary winding is more than the set voltage $V_{2cset}$, an ON time T1 is shortened in accordance with a difference voltage dV there between, whereby energy stored in the transformer is reduced during one time cycle such that the flyback voltage $V_{2c}$ is reduced so as to approach the set voltage $V_{2cset}$.

Moreover, in the case that the flyback voltage $V_{2c}$ of the auxiliary winding is less than the set voltage $V_{2cset}$, the ON time T1 is lengthened in accordance with the difference voltage dV there between, whereby energy stored in the transformer is increased during one time cycle such that the flyback voltage $V_{2c}$ is increased so as to approach the set voltage $V_{2cset}$.

As a result, the output voltage $V_{2b}$ of the secondary output winding is controlled so as to become the set output voltage $V_{2bset}$.

Accordingly, in the case that the auxiliary winding is provided in the transformer it is possible to execute constant voltage output control of the secondary side by monitoring a potential $V_{2c}$ of the auxiliary winding, and causing this potential $V_{2c}$ to equal a set potential $V_{2cset}$.

According to another aspect of the present invention, a constant voltage output control method for a switching power supply circuit having a transformer provided with a primary winding and an auxiliary winding on a primary side and a secondary output winding on a secondary side; an oscillating switching device which is connected in-series with the primary winding to a direct current power supply that excites the primary winding; a switching control circuit that executes ON/OFF control of the oscillating switching device; and a rectifying smoothing circuit that rectifies and smoothes an output of the secondary output winding; this constant voltage output control method executing a constant voltage control of an output voltage $V_{2o}$ that is generated in the rectifying smoothing circuit by changing an ON time T1 of the switching power supply circuit, comprising the steps of:

deriving a set voltage $V_{2cset}'$ based on equation (4), $$V_{2cset}'=V_{2oset} \times Nt \div Ns \div (1-T2 \times k \div Ls) \quad (4)$$

where, $V_{2oset}$ represents an output voltage of the rectifying smoothing circuit that is subject to the constant voltage control, Nt represents a number of turns of the auxiliary winding, Ns represents a number of turns of the secondary output winding, Ls represents an inductance of the secondary output winding, T2 represents an output time for which output is generated in the rectifying smoothing circuit within an oscillation time cycle Tc, and k represents a proportionality constant provided dividing a forward voltage drop of a diode of the rectifying smooth circuit by an output current;

comparing the set voltage $V_{2cset}'$ with a flyback voltage $V_{2c}$ of the auxiliary winding; and executing at least one of a time shortening control and a time lengthening control such that, in the case that the flyback voltage $V_{2c}$ is more than the set voltage $V_{2cset}'$, the time shortening control is executed that shortens the ON time T1 of the oscillating switching device in accordance with a difference voltage dV between the set voltage $V_{2cset}'$ and the flyback voltage $V_{2c}$, and in the case that the flyback voltage $V_{2c}$ is less than the set voltage $V_{2cset}'$, the time lengthening control is executed that lengthens the ON time T1 of the oscillating switching device in accordance with the difference voltage dV.

If the output voltage $V_{2oset}$ of the rectifying smoothing circuit that is subject to the constant voltage control is substituted into Equation (4), a set voltage $V_{2cset}'$ for setting the output voltage $V_{2o}$ to a constant voltage is obtained.

In the case that a generated flyback voltage $V_{2c}$ of an auxiliary winding is more than the set voltage $V_{2cset}'$, an ON time T1 is shortened in accordance with a difference voltage dV there between, whereby energy stored in the transformer is reduced during one time cycle such that the flyback voltage $V_{2c}$ is reduced so as to approach the set voltage $V_{2cset}$.

Moreover, in the case that the flyback voltage $V_{2c}$ of the auxiliary winding is less than the set voltage $V_{2set}'$, the ON time T1 is lengthened in accordance with the difference voltage dV there between, whereby energy stored in the transformer is increased during one time cycle such that the flyback voltage $V_{2c}$ is increased so as to approach the set voltage $V_{2cset}'$.

As a result, the output voltage $V_{2o}$ of the rectifying smoothing circuit is accurately controlled so as to become the set output voltage $V_{2oset}$.

Accordingly, in the case that the auxiliary winding is provided in the transformer it is possible to execute constant voltage output control of the secondary side by monitoring a potential $V_{2c}$ of the auxiliary winding, and causing this potential $V_{2c}$ to equal a set potential $V_{2cset}$.

According to a further aspect of the present invention, a constant voltage output control device for a switching power supply circuit having a transformer provided with a primary winding and a secondary output winding; an oscillating switching device which is connected in-series with the primary winding to a direct current power supply that excites the primary winding; a primary side current detection portion that indicates a primary winding current Ip flowing in the primary winding based on a voltage drop $V_{ip}$ of an Ip detection resistor, this Ip detection resistor having a resistance value $r_{ip}$ and being connected in-series with the primary winding; a switching control circuit that executes ON control of the oscillating switching device with a predetermined time cycle, and executes OFF control of the oscillating switching device when the primary winding current Ip reaches a maximum current $Ip_{max}$ which is taken to occur when the voltage drop $V_{ip}$ reaches a maximum voltage $V_{iMax}$ that is the multiple of a maximum current $Ip_{max}$ and the resistance value $r_{ip}$; and a rectifying smoothing circuit that rectifies and smoothes an output of the secondary output winding; this constant voltage output control device executing a constant voltage control of an output voltage $V_{2b}$ that is generated in the secondary output winding by changing an ON time T1 of the oscillating switching device, comprising:

a voltage monitoring portion that detects a flyback voltage $V_{2a}$ of the primary winding;

a difference voltage generation circuit which obtains a set voltage $V_{2aset}$ based on equation (1), $$V_{2aset} = Np \div Ns \times V_{2bset} \quad (1)$$

where, $V_{2bset}$ represents an output voltage of the secondary output winding that is subject to the constant voltage control, Np represents a number of turns of the primary winding, and Ns represents a number of turns of the secondary output winding, and which outputs a difference voltage dV expressed by equation (5), $$dV = V_{2a} - V_{2aset} \quad (5)$$

which is based on the set voltage $V_{2aset}$ and the flyback voltage $V_{2a}$ of the primary winding; and an adder circuit that sets a correction voltage drop $V_{ip}'$ by adding the difference voltage dV to the voltage drop $V_{ip}$, wherein the switching control circuit sets the correction voltage drop $V_{ip}'$ as the voltage drop $V_{ip}$ that is compared with the maximum voltage $V_{imax}$, and executes at least one of a time shortening control and a time lengthening control such that, in the case that the flyback voltage $V_{2a}$ is more than the set voltage $V_{2aset}$, the time shortening control is executed that shortens the ON time T1 of the oscillating switching device in accordance with the difference voltage dV, and in the case that the flyback voltage $V_{2a}$ is less than the set voltage $V_{2aset}$, the time lengthening control is executed that lengthens the ON time T1 of the oscillating switching device in accordance with the difference voltage dV.

If the output voltage $V_{2bset}$ of the secondary output winding that is subject to the constant voltage control is substituted into Equation (1), the set voltage $V_{2aset}$ for setting the output voltage $V_{2b}$ to a constant voltage is obtained.

In the case that the flyback voltage $V_{2a}$ of the primary winding is more than the set voltage $V_{2aset}$, a difference voltage dV obtained from Equation (5) becomes a positive value, and a correction voltage drop $V_{ip}'$ becomes larger than a voltage drop $V_{ip}$ that indicates a current Ip actually flowing in the primary winding while ON control of the oscillating switching device, and quickly reaches a maximum voltage $V_{iMax}$. As a result, an ON time T1 is only shorted by an increase portion of the difference voltage dV, and the flyback voltage $V_{2a}$ is reduced so as to approach the set voltage $V_{2aset}$.

Further, in the case that the flyback voltage $V_{2a}$ of the primary winding is less than the set voltage $V_{2aset}$, the difference voltage dV becomes a negative value, and the correction voltage drop $V_{ip}'$ becomes smaller than the voltage drop $V_{ip}$ that indicates the current Ip actually flowing in the primary winding while ON control of the oscillating switching device, and leisurely reaches the maximum voltage $V_{iMax}$. As a result, the ON time T1 is only lengthened by the increase portion of the difference voltage dV, and the flyback voltage $V_{2a}$ is increased so as to approach the set voltage $V_{2aset}$.

Accordingly, it is possible to accurately execute the constant voltage control such that the output voltage $V_{2b}$ of the secondary output winding is set to the predetermined set output voltage $V_{2bset}$, while also executing OFF control of the oscillating switching device when the voltage drop $V_{ip}$ reaches the maximum voltage $V_{imax}$, which is the multiple of a maximum current $Ip_{max}$ and a resistance value $r_{ip}$, so that electric power generated in each oscillation is approximately constant value.

According to another aspect of the present invention, a constant voltage output control device for a switching power supply circuit having a transformer provided with a primary winding and a secondary output winding; an oscillating switching device which is connected in-series with the primary winding to a direct current power supply that excites the primary winding; a primary side current detection portion that indicates a primary winding current Ip flowing in the primary winding based on a voltage drop $V_{ip}$ of an Ip detection resistor, this Ip detection resistor having a resistance value $r_{ip}$ and being connected in-series with the primary winding; a switching control circuit that executes ON control of the oscillating switching device with a predetermined time cycle, and executes OFF control of the oscillating switching device when the primary winding current Ip reaches a maximum current $Ip_{max}$ which is taken to occur when the voltage drop $V_{ip}$ reaches a maximum voltage $V_{imax}$ that is the multiple of a maximum current $Ip_{max}$ and the resistance value $r_{ip}$; and a rectifying smoothing circuit that rectifies and smoothes an output of the secondary output winding; this constant voltage output control device executing a constant voltage control of an output voltage $V_{2o}$ of the rectifying smoothing circuit by changing an ON time T1 of the oscillating switching device, comprising:

a voltage monitoring portion that detects a flyback voltage $V_{2a}$ of the primary winding;

an output time detection portion that detects an output time T2 for which output is generated in the rectifying smoothing circuit during an oscillation time cycle Tc;

a difference voltage generation circuit which obtains a set voltage $V_{2aset}'$ based on equation (2), $$V_{2aset}' = V_{2oset} \times Np \div Ns \div (1 - T2 \times k \div Ls) \quad (2)$$

where, $V_{2oset}$ represents an output voltage of the rectifying smoothing circuit that is subject to the constant voltage control, Np represents a number of turns of the primary winding, Ns represents a number of turns of the secondary output winding, Ls represents an inductance of the secondary output winding, T2 represents the output time for which output is generated in the rectifying smoothing circuit within the oscillation time cycle Tc, and k represents a proportionality constant provided dividing a forward voltage drop of a diode of the rectifying smooth circuit by an output current, and which outputs a difference voltage dV expressed by equation (6)

$$dV = V_{2a} - V_{2aset}' \quad (6)$$

which is based on the set voltage $V_{2aset}'$ and the flyback voltage $V_{2a}$ of the primary winding; and an adder circuit that sets a correction voltage drop $V_{ip}'$ by adding the difference voltage dV to the voltage drop $V_{ip}$, wherein the switching control circuit sets the correction voltage drop $V_{ip}'$ as the voltage drop $V_{ip}$ that is compared with the maximum voltage $V_{iMax}$, and executes at least one of a time shortening control and a time lengthening control such that, in the case that the flyback voltage $V_{2a}$ is more than the set voltage $V_{2aset}'$, the time shortening control is executed that shortens the ON time T1 of the oscillating switching device in accordance with the difference voltage dV, and in the case that the flyback voltage $V_{2a}$ is less than the set voltage $V_{2aset}'$, the time lengthening control is executed that lengthens the ON time T1 of the oscillating switching device in accordance with the difference voltage dV.

If the output voltage $V_{2oset}$ of the rectifying smoothing circuit that is subject to the constant voltage control is substituted into Equation (2), the set voltage $V_{2aset}'$ for setting the output voltage $V_{2o}$ to a constant voltage is obtained.

In the case that the flyback voltage $V_{2a}$ of the primary winding is more than the set voltage $V_{2set}'$, a difference voltage dV obtained from Equation (5) becomes a positive value, and the correction voltage drop $V_{ip}'$ becomes larger than the voltage drop $V_{ip}$ that indicates the current Ip actually flowing in the primary winding while ON control of the oscillating switching device, and quickly reaches the maximum voltage $V_{iMax}$. As a result, the ON time T1 is only shortened by an increase portion of the difference voltage dV, and the flyback voltage $V_{2a}$ is reduced so as to approach the set voltage $V_{2aset}'$.

Further, in the case that the flyback voltage $V_{2a}$ of the primary winding is less than the set voltage $V_{2set}'$, the difference voltage dV becomes a negative value, and the correction voltage drop $V_{ip}'$ becomes larger than the voltage drop $V_{ip}$ that indicates the current Ip actually flowing in the primary winding while ON control of the oscillating switching device, and leisurely reaches the maximum voltage $V_{iMax}$. As a result, the ON time T1 is only lengthened by the increase portion of the difference voltage dV, and the flyback voltage $V_{2a}$ is increased so as to approach the set voltage $V_{2aset}'$.

Accordingly, it is possible to accurately execute the constant voltage control such that the output voltage $V_{2o}$ of the rectifying smoothing circuit is set to the predetermined set output voltage $V_{2oset}$, while also executing OFF control of the oscillating switching device when the voltage drop $V_{ip}$ reaches the maximum voltage $V_{imax}$, which is the multiple of the maximum current $Ip_{max}$ and the resistance value $r_{ip}$, so that electric power generated in each oscillation is approximately constant value.

According to a further aspect of the present invention, a constant voltage output control device for a switching power supply circuit having a transformer provided with a primary winding and a secondary output winding; an oscillating switching device which is connected in-series with the primary winding to a direct current power supply that excites the primary winding; an oscillator circuit that generates a pulse control signal with a fixed time cycle Tc, a single cycle of the fixed time cycle Tc being formed by respective output periods of a first level and a second level continuous with the first level; a switching control circuit that executes ON control of the oscillating switching device while the pulse control signal is the first level, and executes OFF control of the oscillating switching device while the pulse control signal is the second level; and a rectifying smoothing circuit that rectifies and smoothes an output of the secondary output winding; this constant voltage output control device executing a constant voltage control of an output voltage $V_{2b}$ that is generated in the secondary output winding by changing an ON time T1 of the oscillating switching device, comprising:

a primary side current detection portion that indicates a primary winding current Ip flowing in the primary winding based on a voltage drop $V_{ip}$ of an Ip detection resistor, this Ip detection resistor having a resistance value $r_{ip}$ and being connected in-series with the primary winding;

a voltage monitoring portion that detects a flyback voltage $V_{2a}$ of the primary winding;

a difference voltage generation circuit which obtains a set voltage $V_{2aset}$ based on equation (1), $$V_{2aset} = Np \div Ns \times V_{2bset} \quad (1)$$

where, $V_{2bset}$ represents an output voltage of the secondary output winding that is subject to the constant voltage control, Np represents a number of turns of the primary winding, and Ns represents a number of turns of the secondary output winding, and which outputs a difference voltage dV expressed by equation (5), $$dV = V_{2a} - V_{2aset} \quad (5)$$

which is based on the set voltage $V_{2aset}$ and the flyback voltage 2a of the primary winding; and a pulse width modulation circuit that executes pulse width modulation of a pulse width of the first level of the pulse control signal using the difference voltage dV, wherein the switching control circuit executes at least one of a time shortening control and a time lengthening control such that, in the case that the flyback voltage $V_{2a}$ is more than the set voltage $V_{2aset}$, the time shortening control is executed that shortens the ON time T1 of the oscillating switching device in accordance with the difference voltage dV, and in the case that the flyback voltage $V_{2a}$ is less than the set voltage $V_{2aset}$, the time lengthening control is executed that lengthens the ON time T1 of the oscillating switching device in accordance with the difference voltage dV.

If the output voltage $V_{2bset}$ of the secondary output winding that is subject to the constant voltage control is substituted into Equation (1), the set voltage $V_{2aset}$ for setting the output voltage $V_{2b}$ to a constant voltage is obtained.

A pulse width of a first level that indicates an ON time T1 of an oscillating switching device is pulse width modulated using a difference voltage dV obtained from Equation (5). In the case that the flyback voltage $V_{2a}$ of the primary winding is more than the set voltage $V_{2aset}$, the pulse width is made smaller in accordance with an increase portion of the difference voltage dV, and the ON time T1 is controlled to become shorter. Accordingly, the flyback voltage $V_{2a}$ is reduced so as to approach the set voltage $V_{2aset}$.

Further, in the case that the flyback voltage $V_{2a}$ of the primary winding is less than the set voltage $V_{2aset}$, the pulse width is made larger in accordance with a decrease portion of the difference voltage dV, the ON time T1 is made longer, and the flyback voltage $V_{2a}$ is increased so as to approach the set voltage $V_{2aset}$. Accordingly, the output voltage $V_{2b}$ of the secondary output winding is controlled so as to become the set output voltage $V_{2bset}$.

Therefore, it is possible to adjust the ON time T1 in accordance with the difference voltage dV of the voltage $V_{2a}$ of the primary winding and the set voltage $V_{2aset}$, using a simple circuit including a PWM circuit.

According to a further aspect of the present invention, a constant voltage output control device for a switching power supply circuit having a transformer provided with a primary winding and a secondary output winding; an oscillating switching device which is connected in-series with the primary winding to a direct current power supply that excites the primary winding; an oscillator circuit that generates a pulse control signal with a fixed time cycle Tc, a single cycle of the fixed time cycle Tc being formed by respective output periods of a first level and a second level continuous with the first level; a switching control circuit that executes ON control of the oscillating switching device while the pulse control signal is the first level, and executes OFF control of the oscillating switching device while the pulse control signal is the second level; and a rectifying smoothing circuit that rectifies and smoothes an output of the secondary output winding; this constant voltage output control device executing a constant voltage control of an output voltage $V_{2o}$ of the rectifying smoothing circuit by changing an ON time T1 of the oscillating switching device, comprising:

a primary side current detection portion that indicates a primary winding current Ip flowing in the primary winding based on a voltage drop $V_{ip}$ of an Ip detection resistor, this Ip detection resistor having a resistance value $r_{ip}$ and being connected in-series with the primary winding;

a voltage monitoring portion that detects a flyback voltage $V_{2a}$ of the primary winding;

an output time detection portion that detects an output time T2 for which output is generated in the rectifying smoothing circuit during an oscillation time cycle Tc;

a difference voltage generation circuit which obtains a set voltage $V_{2aset}'$ based on equation (2), $$V_{2aset}' = V_{2oset} \times Np \div Ns \div (1 - T2 \times k \div Ls) \qquad (2)$$

where, $V_{2oset}$ represents an output voltage of the rectifying smoothing circuit that is subject to the constant voltage control, Np represents a number of turns of the primary winding, Ns represents a number of turns of the secondary output winding, Ls represents an inductance of the secondary output winding, T2 represents the output time for which output is generated in the rectifying smoothing circuit within the oscillation time cycle Tc, and k represents a proportionality constant provided dividing a forward voltage drop of a diode of the rectifying smooth circuit by an output current, and which outputs a difference voltage dV expressed by equation (6), $$dV = V_{2a} - V_{2aset}' \qquad (6)$$

which is based on the set voltage $V_{2set}'$ and the flyback voltage 2a of the primary winding; and a pulse width modulation circuit that executes pulse width modulation of a pulse width of the first level of the pulse control signal using the difference voltage dV, wherein the switching control circuit executes at least one of a time shortening control and a time lengthening control such that, in the case that the flyback voltage $V_{2a}$ is more than the set voltage $V_{2aset}'$, the time shortening control is executed that shortens the ON time T1 of the oscillating switching device in accordance with the difference voltage dV, and in the case that the flyback voltage $V_{2a}$ is less than the set voltage $V_{2aset}'$, the time lengthening control is executed that lengthens the ON time T1 of the oscillating switching device in accordance with the difference voltage dV.

If the output voltage $V_{2oset}$ of the rectifying smoothing circuit that is subject to the constant voltage control is substituted into Equation (2), the set voltage $V_{2aset}'$ for setting the output voltage $V_{2o}$ to a constant voltage is obtained.

A pulse width of a first level that indicates an ON time T1 of an oscillating switching device is pulse width modulated using a difference voltage dV obtained from Equation (5). In the case that the flyback voltage $V_{2a}$ of the primary winding is more than the set voltage $V_{2aset}'$, the pulse width is made smaller in accordance with an increase portion of the difference voltage dV, and the ON time T1 is controlled to become shorter. Accordingly, the flyback voltage $V_{2a}$ is reduced so as to approach the set voltage $V_{2aset}'$.

Further, in the case that the flyback voltage $V_{2a}$ of the primary winding is less than the set voltage $V_{2aset}'$, the pulse width is made larger in accordance with a decrease portion of the difference voltage dV, the ON time T1 is made longer, and the flyback voltage $V_{2a}$ is increased so as to approach the set voltage $V_{2aset}'$. Accordingly, the output voltage $V_{2o}$ of the rectifying smoothing circuit is accurately controlled so as to become the set output voltage $V_{2oset}$.

Therefore, it is possible to adjust the ON time T1 in accordance with the difference voltage dV of the voltage $V_{2a}$ of the primary winding and the set voltage $V_{2aset}'$, using a simple circuit including a PWM circuit.

According to further forms of some of the above aspects, it is possible to detect the output time T2 by monitoring the potential of the primary winding. The time T2 for which output is generated in the rectifying smoothing circuit is a discharge time of energy stored in the transformer. The time T2 is equal to the time from when flyback voltage is generated in the primary winding when the oscillating switching device is turned off, until a time when a polarity of the primary winding reverses as a result of the start of natural oscillation following reduction of the flyback voltage. Accordingly, it is possible to detect the output time T2 from the primary side of the transformer by monitoring the potential of the primary winding, without having to monitor the output of the rectifying smoothing circuit.

Accordingly, it is not necessary to provide a transmission element for transmitting detection results of the secondary side to the primary side, and it is possible to execute the constant voltage control using just the primary side of the circuit.

According to further forms of some of the above aspects, it is possible to detect the output time T2 by monitoring the potential of the auxiliary winding of the primary side of the transformer.

The time T2 for which output is generated in the rectifying smoothing circuit is equal to a time from when flyback voltage is generated in the auxiliary winding, until a time when a polarity of the auxiliary winding reverses. Accordingly, it is possible to detect the output time T2 from the primary side of the transformer by monitoring the potential of the auxiliary winding of the primary side of the transformer, without having to monitor the output of the rectifying smoothing circuit.

Accordingly, it is not necessary to provide a transmission element for transmitting detection results of the secondary side to the primary side, and it is possible to execute the constant voltage control using just the primary side of the circuit.

According to further forms of some of the above aspects of the present invention, the maximum value of the difference voltage dV is set at a permitted maximum difference voltage $dV_{LIM}$. Accordingly, it is possible to set the permitted maximum difference voltage $dV_{LIM}$ so that the correction voltage drop $V_{ip}'$ does not reach the maximum voltage $V_{iMax\_}$ before the primary winding current Ip is the minimum necessary current for execution of the constant voltage control of the switching power supply circuit.

Accordingly, it is possible to ensure that, during each oscillation time cycle, the primary winding current Ip beyond minimum necessary current for execution of the constant voltage control of the switching power supply circuit.

According to a further form of the certain aspects, in the case that the voltage drop $V_{ip}$ does not reach a minimum potential $V_{imin}$ expressed by equation (7), $$V_{imin} = V_{imax} - dV_{LIM} \quad (7)$$

ON control of the oscillating switching device is temporarily stopped.

In the case that the voltage drop $V_{ip}$ does not reach a minimum voltage drop $V_{imin}$, the primary winding current Ip that is flowing is small enough that the correction voltage drop $V_{ip}'$ does not reach the maximum voltage $V_{iMax}$ even if the maximum voltage $V_{iMax}$ is added. Thus, it is possible to inhibit generation of over-voltage by temporarily stopping ON control.

According to a further form of the some aspects, a maximum voltage $V_{imax}'$ is derived from equation (8), $$V_{iMax}' = V_{iMax} \delta t \times Vcc \div Lp \times r_{ip} \quad (8)$$

where, δt is a time difference between detection of the drop voltage $V_{ip}$, to which the difference voltage dV has been added, reaching the maximum voltage $V_{imax}$ and stopping of ON control of the oscillating switching device, Vcc represents a power supply voltage of the direct current power supply, and Lp represents an inductance of the primary winding, and the switching control circuit sets this maximum voltage $V_{imax}'$ as the maximum voltage $V_{imax}$ that is compared with the correction voltage drop $V_{ip}$.

Following turn off of the oscillation switching device, the primary winding current Ip increases almost proportionally to a power supply voltage Vcc÷Lp. Thus, δt×Vcc÷Lp×$r_{ip}$ of Equation (8) expresses a voltage converted increase portion of the current Ip caused by a delay δt between operations of the switching control circuit and the oscillating switching device.

Thus, the switching control circuit is able to accurately execute the constant voltage control even if there is delay caused by circuit elements, since a maximum voltage Vimax' including delay of the circuit elements is set to the maximum voltage $V_{imax}$ which is a reference potential that executes turn off of the oscillating switching device.

BRIEF DESCRIPTION OF THE DRAWINGS

FIG. 3 is a graph showing a comparison of a voltage drop $V_{ip}$ and a correction voltage drop $V_{ip}'$ that increase after the switching device turns on;

FIG. 7 is a waveform diagram for a PWM circuit; and

DETAILED DESCRIPTION OF THE PREFERRED EMBODIMENTS

Figure 8:
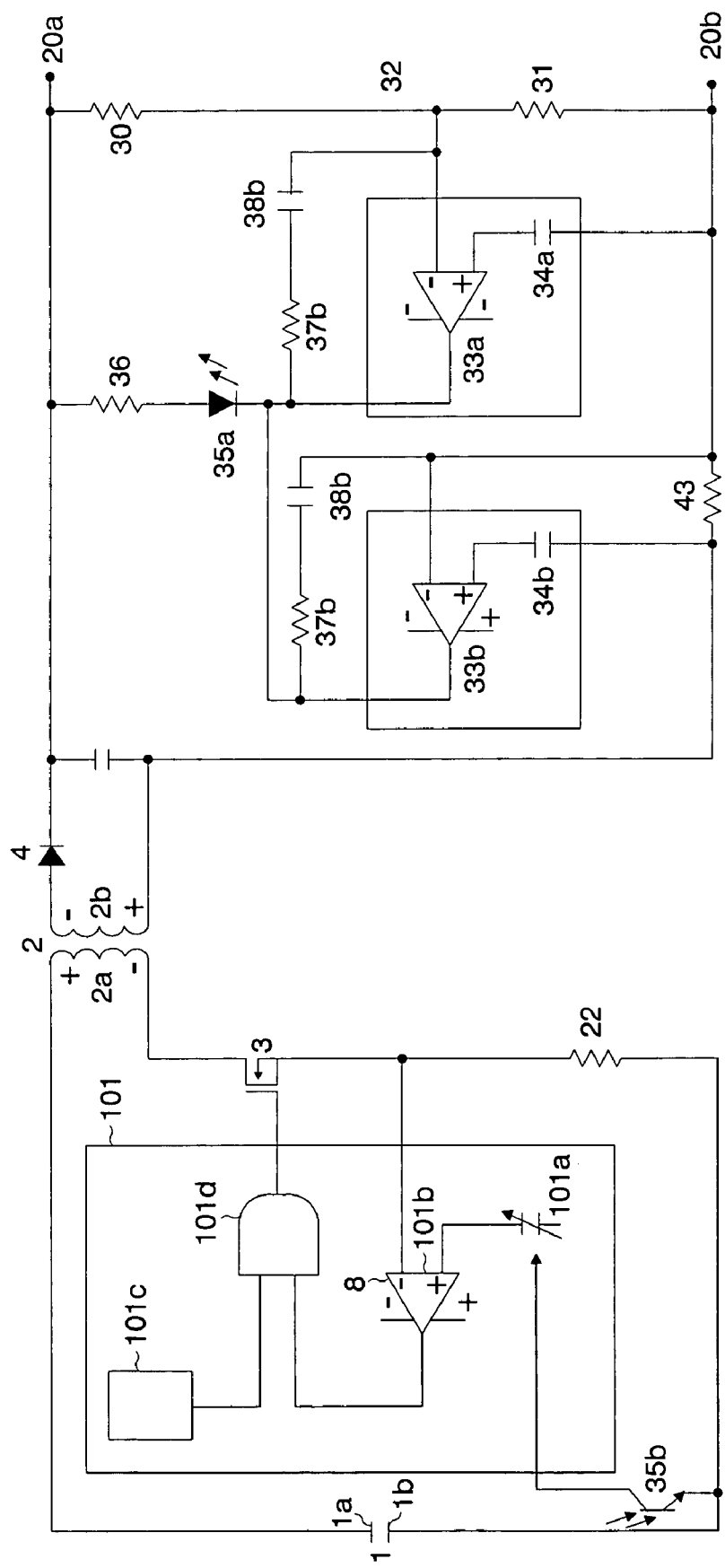
FIG. 8 is a circuit diagram of a conventional switching power supply circuit.

Hereinafter, an embodiment of the present invention will be described with reference to FIGS. 1 to 3. It should be noted that, in the figures, structural members that are the same as those in the conventional switching power supply circuit 100 shown in FIG. 8, will be denoted with the same reference numerals.

Figure 1:
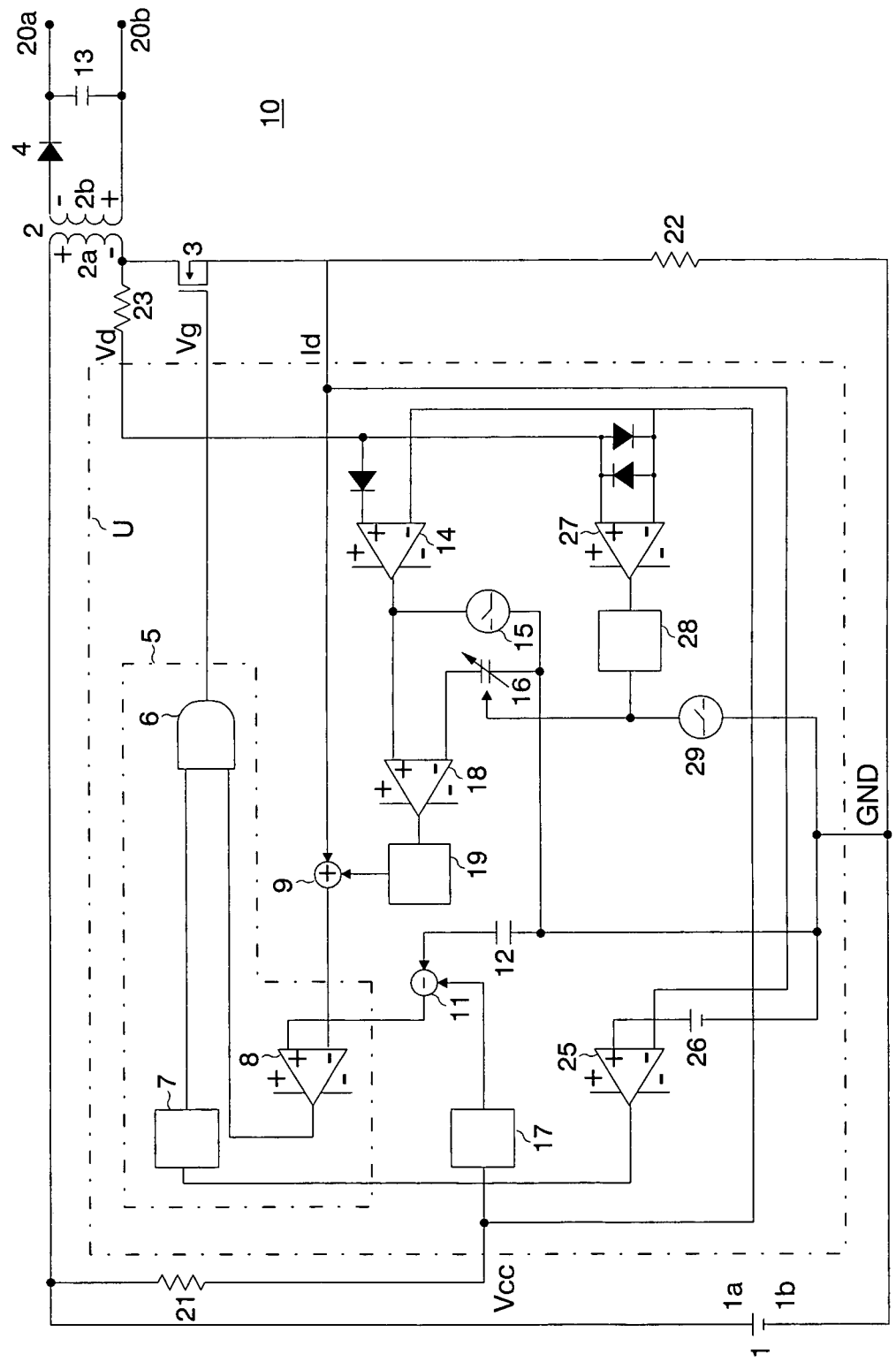
FIG. 1 is a circuit diagram of a switching power supply circuit according to an embodiment of the present invention.

FIG. 1 is a circuit diagram of a switching power supply circuit 10 according to the first embodiment of the present invention. As is apparent through comparison with the conventional switching power supply circuit 100 shown in FIG. 8, the configuration of the switching power supply circuit 10 does not utilize a voltage monitoring circuit on the output side, an optically coupled device, or the like.

In FIG. 1, an unstable direct current power supply 1 that allows variation in voltage has a high voltage side terminal 1a and a low voltage side terminal 1b. Further, a transformer 2 is provided with a primary winding 2a and a secondary output winding 2b. A field effect transistor (FET) 3 acts as an oscillating switching device (hereinafter referred to as a "switching device"). The switching device 3 is, in this case, a MOS (insulated gate type) FET. The switching device 3 has a drain connected to one end of the primary winding 2a, and a source connected to the low voltage side terminal 1b via an Ip detection resistor 22. A gate of the switching device 3 is connected to a switching control circuit 5 that executes ON/OFF control of the switching device 3.

The switching control circuit 5 is configured from an AND gate 6 which has an output terminal Vg connected to the gate of the switching device 3; an oscillator 7 that generates a clock pulse that is equal to a frequency cycle of the switching power supply circuit 10 with a fixed time cycle Tc, and outputs this clock pulse to the AND gate 6; and a comparator 8 having an output connected to another input of the AND gate 6.

A non-inverting input of the comparator 8 is connected to a first reference power supply 12 set at a potential of a maximum voltage $V_{imax}$, described hereinafter, via a subtracter 11, and the maximum voltage $V_{imax}$ is input to the comparator 8. Further, the inverting input of the comparator 8 connects an input terminal Id to a connection point of the Ip detection resistor 22 and the switching device 3 via the adder 9, such that a voltage drop $V_{ip}$ of the Ip detection resistor 22, resulting from a primary winding current Ip flowing in the primary winding 2a, is input to the comparator 8. Accordingly, the voltage drop $V_{ip}$ is obtained by multiplying the primary winding current Ip by a resistance value $r_{ip}$ of the Ip detection resistor 22 that is a constant, and indicates the value of the primary winding current Ip.

Moreover, the maximum voltage $V_{imax}$ that is input to the other side of the comparator 8 is determined by an electric power P generated by the switching power supply circuit 10.

In other words, the switching power supply circuit 10 is configured to act as a converter in which the electric power P is generated in the primary winding 2a, and then transmitted to the secondary winding 2b. The electric power P is generated in accordance with Equation (9) below:

$$P = \tfrac{1}{2} \times Lp \times Ip_{max}^2 \div Tc \qquad (9)$$

where, an inductance of the primary winding 2a is Lp, and a maximum current flowing in the primary winding 2a when the switching device 3 is switched OFF (hereinafter referred to as "turn off") is $Ip_{max}$. If the inductance Lp of the primary winding 2a and the frequency cycle Tc are taken to be constants, this electric power P is proportional to the square of the maximum current $Ip_{max}$.

Accordingly, at first, the electric power P that appropriate accords with the magnitude of a load connected between output lines 20a and 20b of the secondary side is obtained. Then, the electric power P is substituted into Equation (9), the maximum current $Ip_{max}$ is obtained, and set the maximum voltage $V_{imax}$ by multiplying the value of the maximum current $Ip_{max}$ and the resistance value $r_{ip}$.

Voltage conversion of this type using multiplication of the resistance value $r_{ip}$ is executed so as to compare the primary winding current Ip and the maximum current $Ip_{max}$ at the same amplification. This can be executed because the voltage drop $V_{ip}$ input to the other side of the comparator 8 is equal to the primary winding current Ip multiplied by the resistance value $r_{ip}$.

It should be noted that direct comparison of the primary winding current Ip and the maximum current $Ip_{max}$ as current values is possible; however, in this case, conversion to voltage values makes it possible to easily execute adding in the calculation circuit or comparison processing using the comparator 10, and the like.

Next, a basic operation of the switching power supply circuit 10 in which other values are not input to the adder 9, the subtracter 11 will be briefly explained. While "L" is output from the oscillator 7, the output terminal Vg of the AND gate 6 becomes "L", and the switching device 3 is OFF controlled.

In this state, the primary winding current Ip does not flow, and thus the voltage drop $V_{ip}$ is "0", and the output of the comparator 8 that is compared with the maximum voltage $V_{imax}$ becomes "H".

When the output of the oscillator 7 turns the level to "H", because of the output of the comparator 8 level is also "H", the output terminal Vg of the AND gate 6 switches to "H". Then a forward bias voltage is applied to the gate of the switching device 3 and the switching device 3 turns on. As a result, an exciting current Ip begins to flow in the primary winding 2a that is connected in series with the direct current power supply 1, and an induced electromotive force is generated in each of the windings 2a and 2b of the transformer 2.

In FIG. 2(a) shows a current Ip flowing in a primary winding 2a of a transformer 2, (b) shows a current is flowing in a secondary output winding 2b of the transformer 2, and (c) shows a voltage $V_{2a}$ of the primary winding 2a of the transformer 2.

Figure 2:
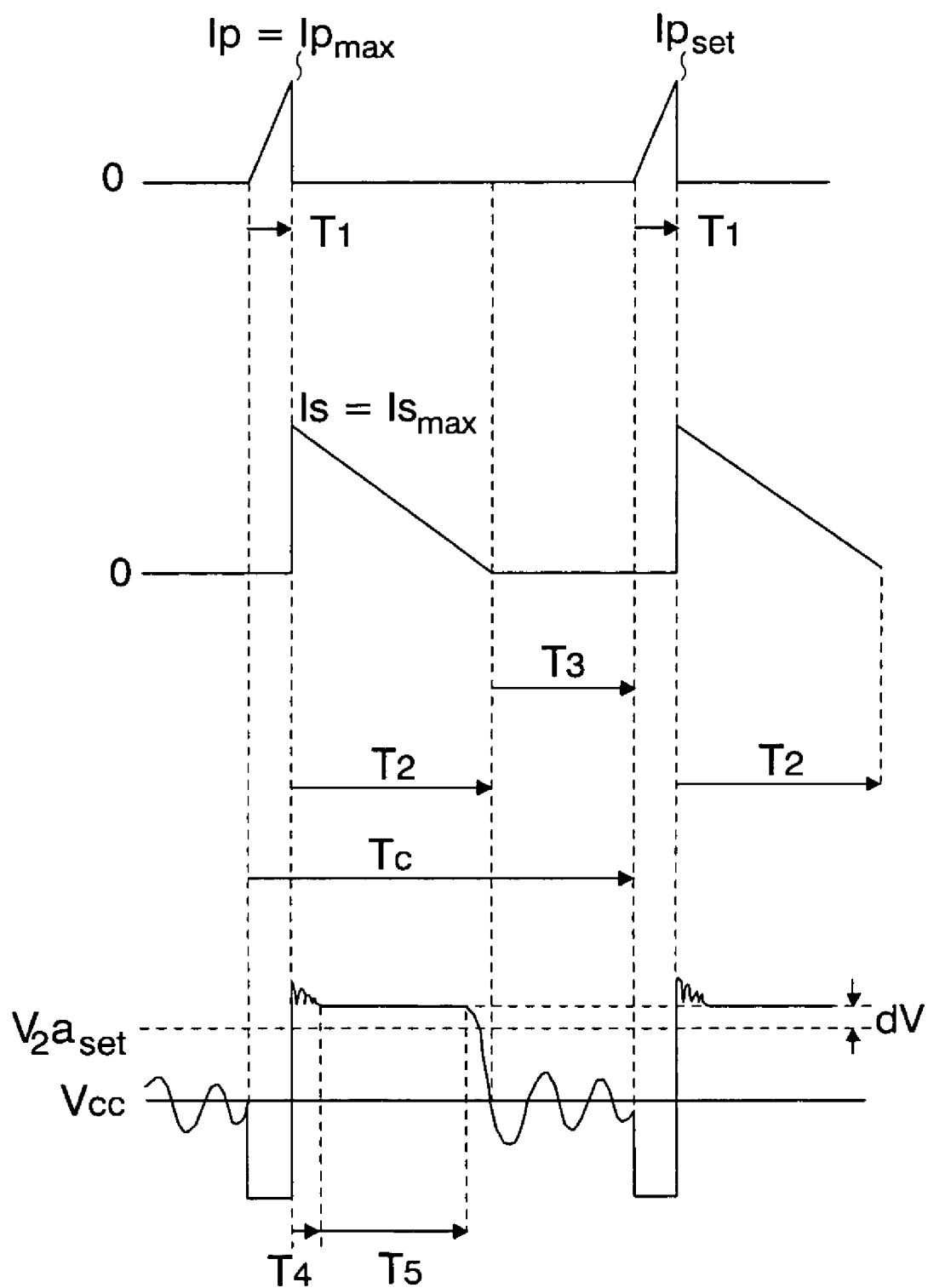
FIG. 2 is a waveform diagram showing respective enlarged voltage and current waveforms for each portion of the switching power supply circuit.
Figure 3:
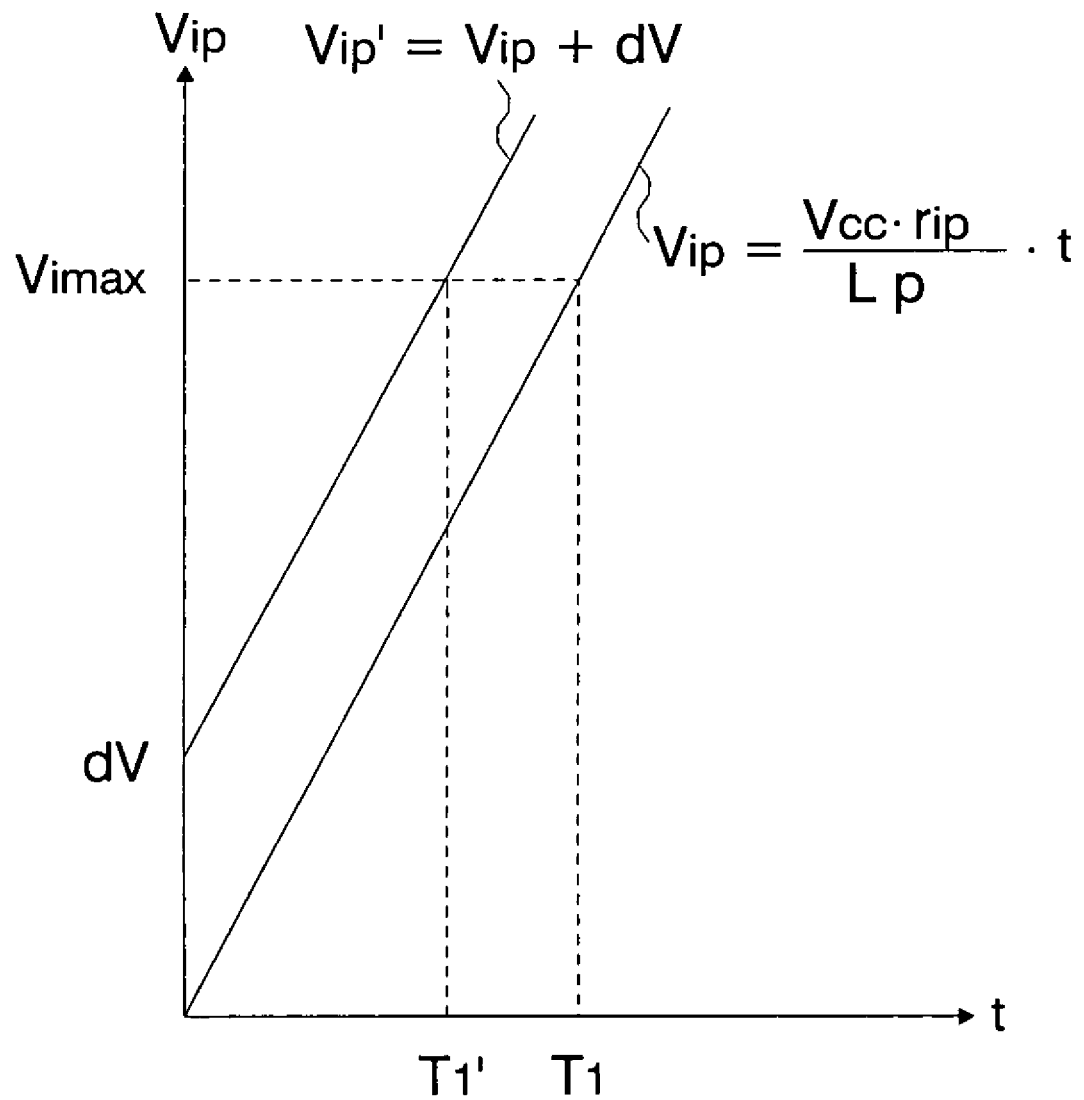

As shown in FIG. 2, the primary winding current Ip increases in proportion to an elapsed time t following turn on, and when it reaches the maximum current $Ip_{max}$ after time T1, the voltage drop $V_{ip}$ reaches maximum voltage $V_{imax}$ and the output of the comparator 8 switches to "L".

Accordingly, the output terminal Vg of the AND gate 6 becomes "L", and the switching device 3 is controlled to turn off, consequently the current flowing in the primary winding 2a becomes substantially interrupted. Note that, in order to continue OFF control, the output of the comparator 8 keeps "L" level until, at the least, the clock pulse output from the oscillator 7 is switched from "H" to "L".

As a result of the switching device 3 turns off, a so-called flyback voltage is generated in each of the windings 2a and 2b of the transformer 2. The flyback voltage generated in the secondary output winding 2b is rectified and smoothed by rectifying smoothing circuit 4 and 13, configured from the rectifying diode 4 and the smoothing capacitor 13, and then output as the electric power P supplied to a load connected between the output lines 20a and 20b.

When electric energy stored in the secondary output winding 2b as a result of the induced electromotive force is entirely discharged, oscillation begins due to series resonance of stray capacity of the primary winding 2a and the switching device 3, and so on, with inductance of the primary winding 2a, as shown by a voltage ($V_{2a}$) waveform of the primary winding 2a in FIG. 2(c). This oscillation gradually reduces in magnitude.

After the voltage generated in each of the windings 2a and 2b falls, the clock pulse output by the oscillator 7 switches from "L" to "H" once again, and ON control of the switching device 3 is executed. Accordingly, in this manner, a series of oscillation operations are repeated with the fixed time cycle Tc.

During this oscillation operation, the flyback voltage generated in each of the windings 2a and 2b of the transformer 2 is proportional to a respective number of turns thereof. Accordingly, the flyback voltage $V_{2a}$ of the primary winding 2a, and a flyback voltage $V_{2b}$ of the secondary output winding 2b are expressed by Equation (10) below:

$$V_{2a} = Np \div Ns \times V_{2b} \qquad (10)$$

where, Np is the number of turns of the primary winding 2a, and Ns is the number of turns of the secondary output winding 2b.

The number of turns Np and Ns are constants determined by circuit elements. Accordingly, if the output voltage $V_{2b}$ in Equation (10) is assumed to be a set output voltage $V_{2bset}$ of the second output winding 2b that is subject to the constant voltage control, control is able to be executed at the primary side of the transformer 2 such that the flyback voltage $V_{2a}$ of the primary winding 2a equals a set voltage $V_{2aset}$ obtained from Equation (1) below:

$$V_{2aset} = Np \div Ns \times V_{2bset} \qquad (1)$$

In order to set the flyback voltage $V_{2a}$ of the primary winding 2a to the set voltage $V_{2aset}$, in this embodiment, the switching power supply circuit 10 is provided with an differential amplifier 14 that monitors the flyback voltage $_{2a}$ of the primary winding 2a; a sample hold circuit 15 connected to an output of the differential amplifier 14; an differential amplifier 18 with a non-inverting input connected to the differential amplifier 14, and a inverting input connected to a variable second reference power supply 16 that normally outputs a potential of the set voltage $V_{2aset}$; a clamp circuit 19; and the aforementioned adder 9.

The non-inverting input of the differential amplifier 14 is connected to the input terminal Vd connected to the low voltage side end portion of the primary winding 2a via a resistor 23, and the inverting input is connected via a resistor 21 to the high voltage side terminal 1a of the direct current power supply 1 that is a potential of the high voltage side end portion of the primary winding 2a. Accordingly, the differential amplifier 14 outputs the flyback voltage $V_{2a}$ generated in the primary winding 2a.

As shown in FIG. 2, the voltage $V_{2a}$ generated in the primary winding 2a is not stable during time $T_4$ after the switching device 3 turns off. Accordingly, the sample hold circuit 15 starts to sample a peak value of the voltage $V_{2a}$ generated in the primary winding 2a, following time $T_1$ has elapsed, from a time point after a delay of time $t_4$ generated by a delay circuit, not shown and at a time point following a predetermined detection time $T_5$ has elapsed and before an output time $T_2$ has elapsed (which is detected by a comparator 27, as will be explained later), acts as a trigger for a sampling value, namely, the flyback voltage $V_{2a}$, to be output to the differential amplifier 18.

To explain a basic operation, the variable second reference power supply 16 outputs the set voltage $V_{2aset}$ without change to the differential amplifier 18, and the differential amplifier 18 outputs a difference voltage dV (refer to FIG. 2(c)) indicated by Equation (5) below to the clamp circuit 19.

$$dV = V_{2a} - V_{2aset} \qquad (5)$$

The clamp circuit 19 outputs the difference voltage dV to one side of the adder 9 by which the difference voltage dV have been added to the voltage drop $V_{ip}$ input from the input terminal Id, and the result is output to the comparator 8. Accordingly, the comparator 8 sets a correction voltage drop $V_{ip}'$ to which the difference voltage dV has been added as the voltage drop $V_{ip}$, and then executes comparison with the maximum voltage $V_{imax}$.

The primary winding current Ip that indicates the voltage drop $V_{ip}$ is expressed by Equation 11:

$$Ip = V_{2a} \div Lp \times t \qquad (11)$$

where, the voltage of the primary winding 2a is $V_{2a}$, and the inductance of the primary winding 2a is Lp. The primary winding current Ip increases in proportion with the voltage added to the primary winding 2a following turn on of the switching device 3.

Note that, as compared to the voltage $V_{2a}$ applied to the primary winding 2a during an ON time of the switching device 3, other voltage drop elements resulting from exciting current flowing in the circuit are very little and are able to ignored, the voltage $V_{2a}$ can be replaced with a power supply voltage Vcc of the direct current power supply 1. As shown by FIG. 3, following turn on of the switching device 3, the voltage drop $V_{ip}$ that indicates the primary winding current Ip increases with respect to the power supply voltage Vcc÷Lp×$r_{ip}$ in an almost proportional manner. Once the voltage drop $V_{ip}$ reaches the maximum voltage $V_{imax}$ at time $T_1$, the switching device 3 turns off.

On the other hand, in the case that the detected flyback voltage $V_{2a}$ has exceeded the set voltage $V_{2a}$ that is subject to the constant voltage control, and the difference voltage dV is a positive value, the correction voltage drop $V_{ip}'$ reaches the maximum voltage $V_{imax}$ at time $T_1'$, which is prior to elapse of time $T_1$. Accordingly, an ON time $T_1$ is shortened.

As a result, the electric energy generated in the transformer 2 is reduced, and the secondary output winding voltage $V_{2b}$ approaches the output voltage $V_{2bset}$ that is subject to the constant voltage control.

On the other hand, in the case that the detected flyback voltage $V_{2a}$ is less than the set voltage $V_{2aset}$ that is subject to the constant voltage control, and the difference voltage dV is a negative value, the correction voltage drop $V_{ip}'$ reaches the maximum voltage $V_{imax}$ after the time $T_1$ has elapsed. Accordingly, the ON time $T_1$ is lengthened, as a result, the electric energy generated in the transformer 2 is increased, and in this case as well, the secondary output winding voltage $V_{2b}$ approaches the output voltage $V_{2bset}$ that is subject to the constant voltage control.

Following this, by repetition of the method described above, it is possible to execute the constant voltage control in which the output voltage $V_{2b}$ of the secondary output winding 2b is output at the set voltage $V_{2bset}$.

It should be noted that, in this embodiment, when the detected flyback voltage $V_{2a}$ is less that the set voltage $V_{2aset}$ that is subject to the constant voltage control, a large load is connected to the secondary side output line, and it is conceivable that excessive current may be generated in each of the windings 2a and 2b. Accordingly, under the ON time $T_1$ is controlled to be not lengthened, constant current control is executed by a circuit which is not shown. Accordingly, when the difference voltage dV is a negative value, the difference voltage dV is not output from the clamp circuit 19 in this embodiment.

Moreover, the clamp circuit 19 sets an upper limit of the difference voltage dV at a permitted maximum difference voltage $dV_{LIM}$. Thus, when the difference voltage dV has a positive value that exceeds the permitted maximum difference voltage $dV_{LIM}$, the permitted maximum difference voltage $dV_{LIM}$ is output from the adder 9.

The permitted maximum difference voltage $dV_{LIM}$ is set at a value derived from Equation (12):

$$dV_{LIM} \leq V_{imax} - Ip_{min} \times r_{ip} \qquad (12)$$

where, a minimum current that must flow in the primary winding 2a in order to execute the oscillation operation of the switching power supply circuit 10 is $Ip_{min}$.

Accordingly, prior to when the current Ip flowing in the primary winding 2a actually reaches the minimum current $Ip_{min}$, the correction voltage drop $V_{ip}'$ doesn't reach the maximum voltage $V_{imax}$ to turn off, and thus it is possible to reliably continue the oscillation operation.

On the other hand, when a load with a high resistance value is connected to the secondary side, there is a possibility that the detected flyback voltage $V_{2a}$ will become an over-voltage that is significantly larger than the set voltage $V_{2aset}$. In this state, the maximum current $Ip_{max}$ of the primary winding 2a is low, and even if the permitted maximum difference voltage $dV_{LIM}$ is added to the voltage drop $V_{ip}$, the sum doesn't reach the maximum voltage $V_{imax}$.

In other words, in this case the voltage drop $V_{ip}$ does not reach the minimum potential $V_{imin}$ derived from Equation (7).

$$V_{imin} = V_{imax} - dV_{LIM} \quad (7)$$

Accordingly, an over-voltage protection circuit configured from the comparator 25 and a third reference power supply 26 shown in FIG. 1 operates such that a state of over-voltage is avoided.

The non-inverting input of the comparator 25 is connected to the third reference power supply 26 that is set at a potential that is slightly lower than the potential of the minimum potential $V_{imin}$. Moreover, the inverting input is connected to the input terminal Id such that the voltage drop $V_{ip}$ that indicates the primary winding current Ip flowing in the primary winding 2a is input.

The oscillator 7 that is connected to the output of the comparator 25, as described previously, generates the clock pulse with the fixed time cycle Tc. Input of "L" level from the comparator 25 is taken as a prerequisite for generation of the clock pulse for the next cycle. While "L" level is not input, oscillation of the clock pulse stops and after some period (for example, 10 to 20 msec), the clock pulse for the next cycle is generated.

With the over-voltage protection circuit configured in this manner, in the state of over-voltage in which, as described previously, the voltage drop $V_{ip}$ does not reach the minimum potential Vimin, the output of the comparator 8 does not change to "L". However, the switching device 3 turns off as a result of clock pulse of the oscillator 7 turns "L" from "H". On the other hand, the output of the comparator 25 does not turn to "L". Accordingly, in the oscillator 7, oscillation of the clock pulse is stopped for some fixed period (for example, 10 to 20 msec), and the clock pulse does not turn to "H". As a result, the switching device 3 does not turn on, and the electric energy stored in the transformer 2 is gradually reduced as it is consumed by the load of the secondary side. Accordingly, the over-voltage state is removed.

In addition, in a normal operation state in which the correction voltage drop $V_{ip}'$ reaches the maximum voltage $V_{imax}$, when the voltage drop $V_{ip}$ has reached the minimum potential $V_{imin}$, the output of the comparator 25 turns to "L", and following elapse of the fixed time cycle Tc of the oscillator 7, the next clock pulse is generated. Accordingly, the clock pulse is generated continuously without interruption.

The above described embodiment executes the constant voltage control such that the output voltage $V_{2b}$ of the secondary output winding 2b is set to the set voltage $V_{2bset}$. However, it is not sufficiently the case that an output voltage $V_{2o}$ of the rectifying smoothing circuit 4 and 13 is accurately set to a constant voltage.

In other words, the output voltage $V_{2o}$ of the rectifying smoothing circuit 4 and 13 is expressed by Equation (13):

$$V_{2o} = V_{2b} - Vf \quad (13)$$

where, a forward voltage drop portion of the diode 4 of the rectifying smoothing circuit is Vf. The forward voltage drop portion Vf is proportional to a passed current value, namely, a current Is of the secondary output winding 2b, and thus the output voltage $V_{2o}$ does not become a constant voltage even if the constant voltage control of the output voltage $V_{2b}$ is executed.

During the oscillation operation of the switching power supply circuit 10, a maximum current $Is_{max}$ generated in the secondary output winding 2b is expressed by Equation (14) below:

$$Is_{max} = V_{2b} \div Ls \times T2 \quad (14)$$

where, the output voltage of the secondary output winding 2b is $V_{2b}$, an inductance of the secondary output winding 2b is Ls, and the output time for which output is generated in the rectifying smoothing circuit 4 and 13 is T2.

Using the Equation (14), Equation (13) can be expressed to Equation (15) below:

$$V_{2o} = V_{2b} (1 - k \div Ls \times T2) \quad (15)$$

Where, a proportionality constant as a result of dividing the forward voltage drop of the diode 4 by the maximum current $Is_{max}$ is k.

Moreover, if output voltage $V_{2b}$ is substituted with the voltage $V_{2a}$ using Equation (10):

$$V_{2a} = Np \div Ns \times V_{2b} \quad (10)$$

it is possible to obtain Equation (16):

$$V_{2a} = V_{2o} \times Np \div Ns \div (1 - T2 \times k \div Ls) \quad (16)$$

Accordingly, by means of setting the output voltage $V_{2o}$ of Equation (16) to the output voltage $V_{2oset}$ of the rectifying smoothing circuits 4 and 13 that is subject to the constant voltage control, control is executed at the primary side of the transformer 2 such that the flyback voltage $V_{2a}$ of the primary winding 2a equals a set voltage $V_{2aset}'$ obtained from Equation (2) below:

$$V_{2aset}' = V_{2oset} \times Np \div Ns \div (1 - T2 \times k \div Ls) \quad (2)$$

Note that, Np, Ns, Ls and k are constants determined by circuit elements and the output time T2 for which output is generated in the rectifying smoothing circuits 4 and 13 is able to be detected.

Thus, it is possible to execute the constant voltage control such that the output voltage $V_{2o}$ of the rectifying smoothing circuits 4 and 13 is set to the output voltage $V_{2oset}$ and control the flyback voltage $V_{2a}$ of the primary winding 2a equal to the set voltage $V_{2aset}'$ obtained by substituting $V_{2oset}$ and detected T2 value into Equation (2).

With the switching power supply circuit 10 of FIG. 1, if the set voltage $V_{2aset}'$ obtained from Equation (2) is input to the inverting input of the differential amplifier 18, it is possible to execute the constant voltage control of the output voltage $V_{2o}$ of the rectifying smoothing circuits 4 and 13 using the above described method. For this purpose, the comparator 27, a time T2 time-voltage conversion circuit 28, and a sampling hold circuit 29 are additionally provided in the switching power supply circuit 10.

With regard to the detection of the output time T2 used in Equation (2), it is easily possible to obtain the output time T2 by measurement of the time for which current flows in the diode 4 of the secondary side of the transformer 2. However, in this embodiment, the output time T2 is detected using the comparator 27 so that the constant voltage control is executed using only the primary side circuit of the transformer 2. The comparator 27 has an non-inverting input that is connected to the input terminal Vd connected to the low voltage side end portion of the primary winding 2a via the resistor 23, and an inverting input that is connected via the resistor 21 to the high voltage side terminal 1a of the direct current power supply 1 that is the potential of the high voltage side end portion of the primary winding 2a. The comparator 27 compares the potentials at the both ends of the primary winding 2a.

The output time T2 for which the output current is generated at the secondary side of the transformer 2 is a discharge time of the energy stored in the transformer 2. As shown in FIG. 2, this time is equal to the time from when the oscillating switching device 3 turns off and flyback voltage is generated in the primary winding 2a, until a time when the potential fluctuates centering on the voltage Vcc applied to the transformer 2 as a result of reversal of the polarity of both ends of the primary winding 2a due to reduce the flyback voltage generated in the primary winding 2a and start of natural oscillation.

Accordingly, the output time T2 is detected from the time when the polarity of the primary winding 2a reverses following output of an OFF control signal for turn off the switching control circuit 5, to the time when the polarity reverses once again following the start of natural oscillation. In other words, the output time T2 is detected based on the period for which "H" is output from the comparator 27.

Note that, following turn off of the switching control circuit 5, the time until the waveform of the primary winding voltage $V_{2a}$ reaches its initial minimum value due to the natural oscillation approximates to the time taken for the polarity of the primary winding 2a to reverse. Accordingly, the output time T2 may also be detected by estimating the time from which the OFF control signal is output until when the initial minimal value.

The output of the comparator 27 is connected to an input of the T2 time-voltage conversion circuit 28. The T2 time-voltage conversion circuit 28 takes the period during which "H" is input from the comparator 27 as the output time T2, and calculates a control voltage Vk by voltage dividing the value of Np÷Ns÷(1−T2×k÷Ls) using the output time T2, and then outputs the control voltage Vk to the sample hold circuit 29. The sample hold circuit 29 outputs this control voltage Vk to the variable second reference power supply 16 until the comparator 27 detects the output time T2 of the next oscillation cycle period.

When the variable second reference power supply 16 receives the control voltage Vk, it outputs the potential of the set voltage $V_{2aset}'$ obtained from Equation (2) to the inverting input of the differential amplifier 18. Accordingly, the ON time T1 is controlled such that the flyback voltage $V_{2a}$ becomes the set voltage $V_{2aset}'$.

Thereafter, it is possible to execute the constant voltage control in which the output voltage $V_{2o}$ of the rectifying smoothing circuits 4 and 13 is controlled to the set voltage $V_{2oset}$ that takes into account the voltage drop portion Vf of the diode 4, by detecting the output time T2 for each oscillation cycle period and repeating the same control.

In either of the embodiments described above, as well, delay which is natural to the circuit elements, such as the adder 9, the comparator 8, the AND gate 6, and the switching device 3, is generated between the time of input of the primary winding current Ip that allows the correction voltage drop $V_{ip}'$ to reach the maximum voltage $V_{imax}$, and the time when the switching device 3 is actually turned off.

As described previously, the primary winding current Ip is expressed by Equation (11):

$$Ip = V_{2a} \div Lp \times t \qquad (11)$$

where, $V_{2a}$ is the voltage of the primary winding 2a, and Lp is the inductance of the primary winding 2a. This primary winding current Ip increases in proportion to the voltage applied to the primary winding 2a following turn on of the switching device 3.

As compared to the voltage $V_{2a}$ applied to the primary winding 2a during the ON time of the switching device 3, other voltage drop elements resulting from exciting current flowing in the circuit are very little and are able to ignored, the voltage $V_{2a}$ can be substituted with the power supply voltage Vcc of the direct current power supply 1. The primary winding current Ip can be expressed using Equation (17) below in which the voltage $V_{2a}$ is substituted with the power supply voltage Vcc.

$$Ip = Vcc \div Lp \times t \qquad (17)$$

Accordingly, if a sum of the delay times resulting from the aforementioned circuit elements is taken as δt, based on Equation (17), an increase portion δIp thereof is expressed by Equation (18):

$$\delta Ip = Vcc \div Lp \times \delta t \qquad (18)$$

Figure 4:
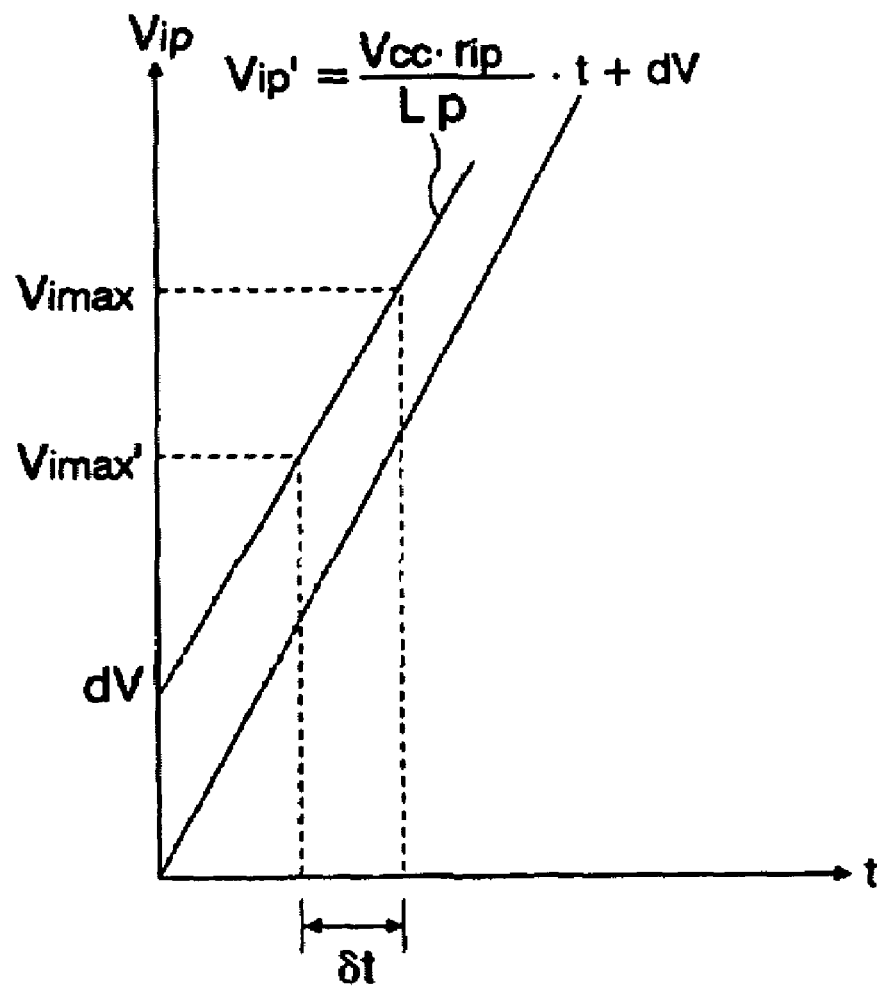
FIG. 4 is a graph showing a comparison of the correction voltage drop $V_{ip}'$ when it is determined that a maximum voltage $V_{imax}$ has been reached, and the correction voltage drop $V_{ip}'$ when the switching device turns off.

As shown in FIG. 4, the correction voltage drop $V_{ip}'$ on the occasion when the switching device 3 turns off, is increased by Vcc÷Lp×$r_{ip}$×δt, as compared to when it reaches the maximum voltage $V_{imax}$.

Note that, if this increase portion is taken into account, the maximum voltage $V_{imax}'$ is derived using Equation (8):

$$V_{iMax}' = V_{iMax} - \delta t \times Vcc \div Lp \times r_{ip} \qquad (8)$$

If this maximum voltage $V_{iMax}'$ is set as the maximum voltage $V_{imax}$ that is compared with the correction voltage drop $V_{ip}$ in the comparator 8, it is possible to turn off the switching device 3 at the timing that the correction voltage drop $V_{ip}'$ reaches real maximum voltage $V_{imax}$.

Note that, with regard to this error resulting from delay of the circuit elements, it is possible to add the increase portion (Vcc÷Lp×$r_{ip}$×δt) to the correction voltage drop $V_{ip}'$ and compare the result to the maximum voltage $V_{imax}$.

In the switching power supply circuit 10 shown in FIG. 1, the delay correction circuit 17 is connected via the resistor 21 to the high voltage side terminal 1a of the direct current power supply 1 that is the potential of the high voltage side end portion, and the power supply voltage Vcc is input thereto. The delay correction circuit 17 generates the increase portion (Vcc÷Lp×$r_{ip}$×δt) due to time delay and outputs to the subtracter 11, and then adding it to the maximum voltage $V_{imax}$ of the first reference power supply 12 for the above described correction processing is executed.

Figure 5:
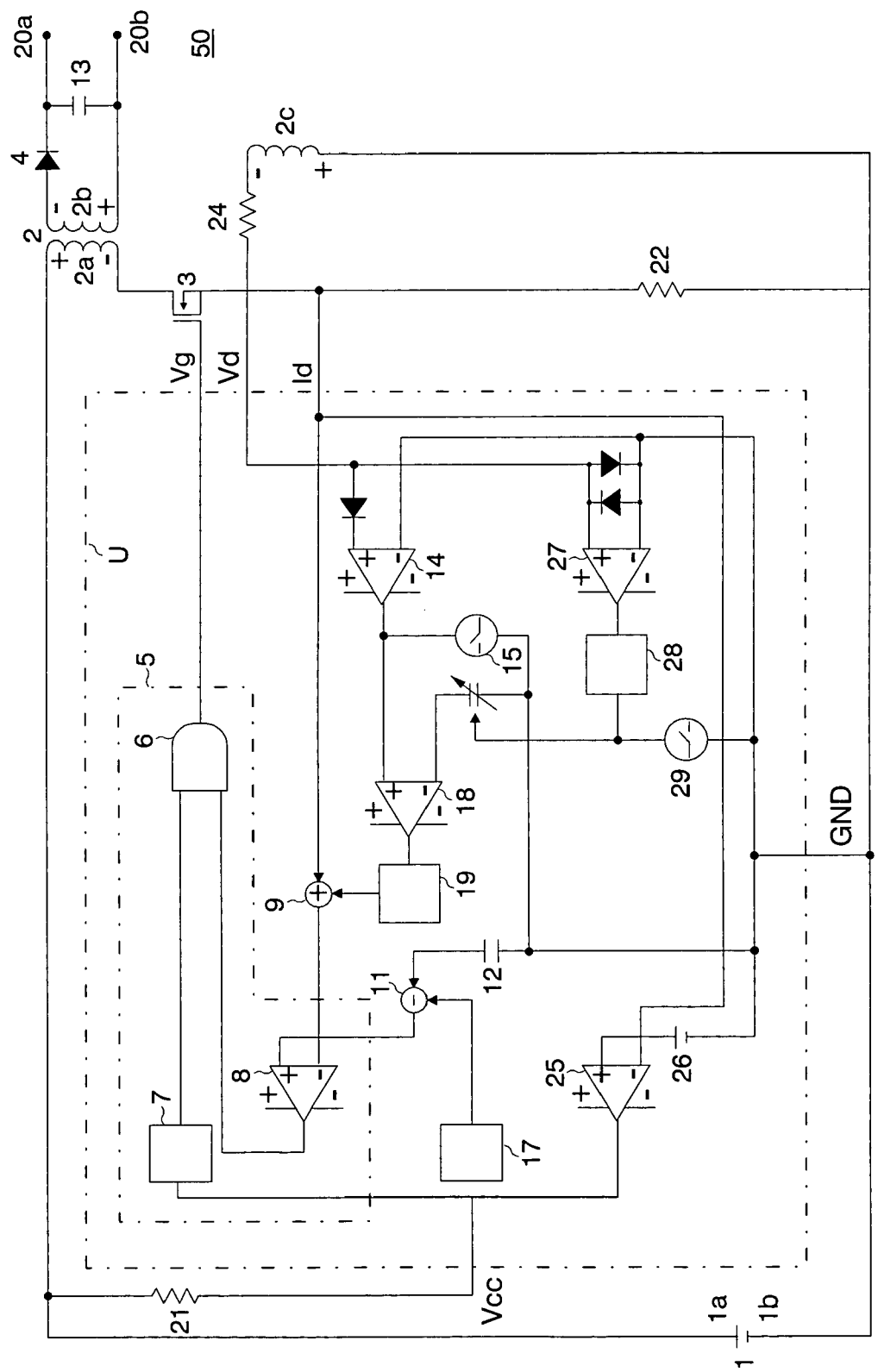
FIG. 5 is a circuit diagram of a switching power supply circuit according to another embodiment of the present invention.

FIG. 5 shows a circuit configuration of a switching power supply circuit 50 of another embodiment according to the present invention in which an auxiliary winding 2c is provided at the primary side of the transformer 2; in this case, a flyback voltage $V_{2c}$ of the auxiliary winding 2c is monitored, a voltage difference dV obtained, and an output time T2 detected.

The switching power supply circuit 50, as compared to the switching power supply circuit 10 shown in FIG. 1, only differs with respect to the fact that the auxiliary winding 2c is additionally provided in the transformer 2, and the input terminal Vd is connected to a low voltage side portion of the auxiliary winding 2c via the resistor 24.

During the oscillation operation of the switching device power supply circuit 50, the respective flyback voltages generated in each of the windings of the above described transformer 2 are proportional to respective numbers of turns thereof. Accordingly, the flyback voltage $V_{2c}$ of the auxiliary winding 2c is also proportional to the flyback voltage $V_{2b}$ of the secondary output winding 2b; thus, both can be expressed by Equation (19):

$$V_{2c} = Nt \div Ns \times V_{2b} \qquad (19)$$

where, a number of turns of the auxiliary winding 2c is Nt, and the number of turns of the secondary output winding 2b is Ns.

The number of turns Nt and Ns are constants determined by circuit elements. Accordingly, in the switching power supply circuit 50, if the output voltage $V_{2b}$ of Equation (19) is set to an output voltage $V_{2bset}$ of the auxiliary winding 2b that is subject to the constant voltage control, control is executed at the primary side of the transformer 2 such that the flyback voltage $V_{2c}$ of the auxiliary winding 2c is equal to a set voltage $V_{2cset}$ obtained from Equation (3) below:

$$V_{2cset} = Nt \div Ns \times V_{2bset} \qquad (3)$$

Accordingly, as compared to the switching power supply circuit 10, the non-inverting input of the differential amplifier 14 is connected to one side end portion of the auxiliary winding 2c via the resistor 24, and the inverting input is connected to the other side of the auxiliary winding 2c that is the grounded side. The differential amplifier 14 outputs the flyback voltage $V_{2c}$ generated in the auxiliary winding 2c.

The flyback voltage $V_{2c}$ is input to one side of the differential amplifier 18. At the other side of the differential amplifier 18, the set voltage $V_{2cset}$ from the variable second reference power supply 16 is input, and a difference voltage dV of the flyback voltage $V_{2c}$ and the set voltage $V_{2cset}$ is output.

In addition, in the case that the constant voltage control of the output voltage $V_{2o}$ of the rectifying smoothing circuits 4 and 13 is executed, taking into account the drop portion of the diode 4 in the same manner as Equation (2), a set potential $V_{2cset}'$ obtained from Equation (4):

$$V_{2cset}' = V_{2oset} \times Nt \div Ns \div (1 - T2 \times k \div Ls) \qquad (4)$$

$V_{2cset}'$ is set as the set potential $V_{2cset}$ that is compared with the flyback voltage $V_{2c}$, and output to the inverting input of the differential amplifier 18.

In Equation (4), the output time T2 for obtaining the set potential $V_{2cset}'$ can also be detected from the voltage $V_{2c}$ of the auxiliary winding 2c with respect to the voltage $V_{2b}$ of the secondary output winding 2b, which is proportional to the turns ratio. Accordingly, in this case, as with the differential amplifier 14, both ends of the auxiliary winding 2c are respectively connected to the pair of inputs of the comparator 27. The output time T2 is detected based on the time from turn off of the switching device 3 until when the polarity of the voltage $V_{2c}$ of the auxiliary winding 2c reverses.

With regard to the remaining configuration of this embodiment, it is the same as that of the above described first embodiment. Accordingly, an explanation will be omitted here.

Figure 6:
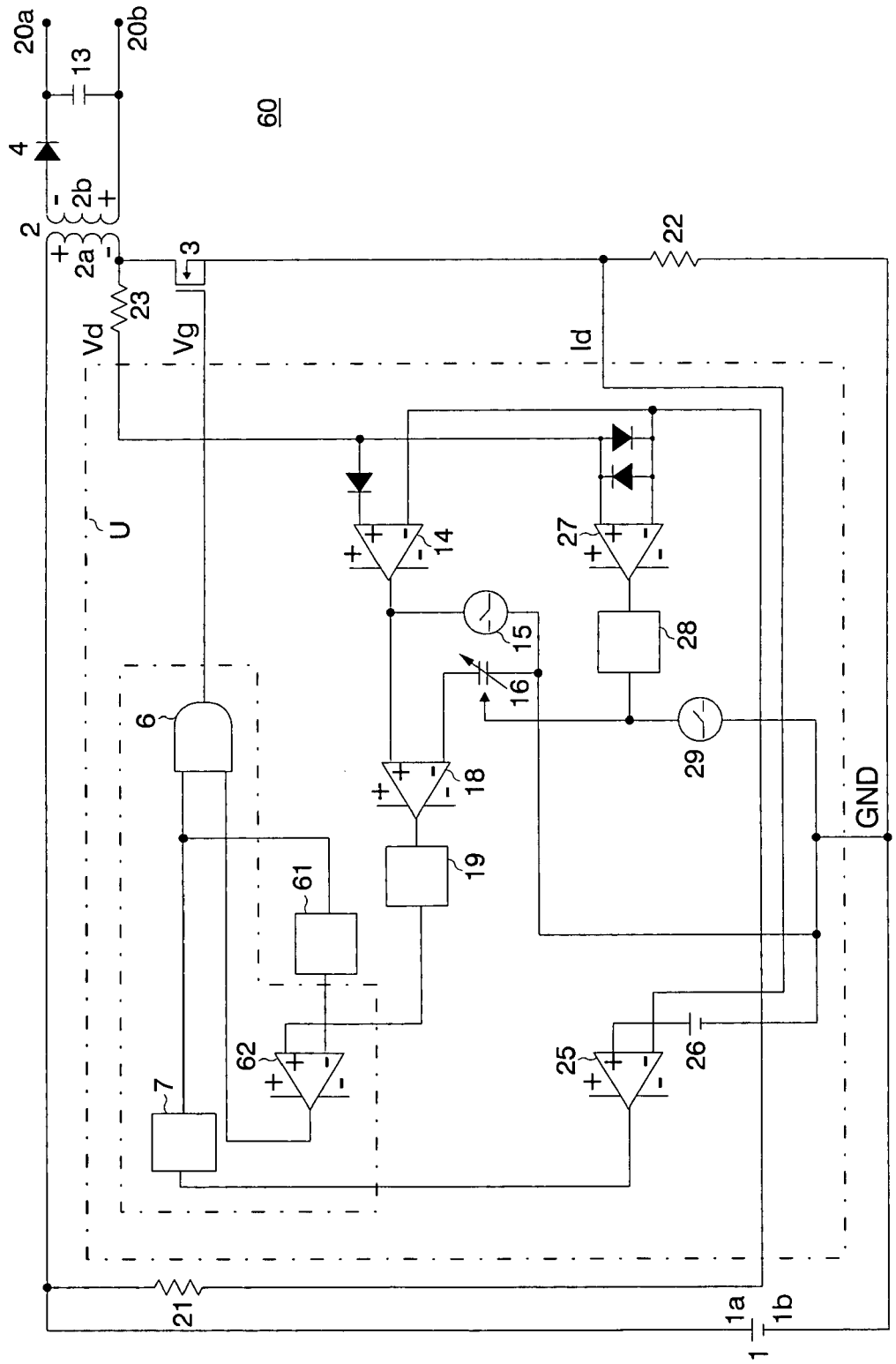
FIG. 6 is a circuit diagram showing a constant voltage output control device of a switching power supply circuit according to yet another embodiment of the present invention.

FIG. 6 shows a circuit configuration of a constant voltage output control device of a switching power supply circuit 60 according to another embodiment of the present invention.

The switching power supply circuit 60 shown in FIG. 6 pulse width modulates a pulse width of a pulse control signal that directly executes ON control of the switching device 3 using the difference voltage dV output from the differential amplifier 18, and uses the difference voltage dV to adjust the ON time T1. Accordingly, the explanation presented here will focus on the configuration of the switching power supply circuit 60 that is different to that of the previously described embodiments. Structural members which are the same as those of the previous embodiments are denoted with the same reference numerals, and an explanation is omitted.

In FIG. 6, a PWM circuit 63 is configured from an integration circuit 61 that obtains an integrated waveform by integrating the clock pulse of the fixed time cycle Tc output from the oscillator 7; a comparator 62 having a inverting input to which the output of the integration circuit 61 is input, and a non-inverting input to which the difference voltage dV output from the clamp circuit 19 is input; the oscillator 7, and the AND gate 6.

The differential amplifier 18 outputs the difference voltage dV to the clamp circuit 19 in the same manner as in the above described embodiments. Accordingly, in the case that the constant voltage control is executed for the output voltage $V_{2b}$ that is generated in the secondary output winding 2b, dV is expressed by Equation (5) below.

$$dV = V_{2a} - V_{2aset} \qquad (5)$$

In the other case that the constant voltage control is executed for the output voltage $V_{2o}$ of the rectifying smoothing circuits 4 and 13, the voltage difference dV is expressed by Equation (6) below.

$$dV = V_{2a} - V_{2aset}' \qquad (6)$$

In FIG. 7(a) shows a clock pulse output from an oscillator 7, (b) shows an integrated signal output from an integrated circuit 61, (c) showing an input signal of a comparator 62, (d) shows an output signal from the comparator 62, and (e) shows a pulse control signal output from an and gate 6.

The oscillator 7, as in the above described embodiments, outputs the clock pulse with the fixed time cycle Tc as shown in FIG. 7(a). This clock pulse is output to one input of the AND gate 6 and the integration circuit 61.

The clock pulse input to the integration circuit 61 is deformed to the integrated waveform of FIG. 7(b) and input to the inverting input of the comparator 62. The comparator 62 compare the integrated waveform with the difference voltage dV input to the non-inverting input via the clamp circuit 19, as shown in FIG. 7(c).

As a result, the pulse waveform shown in FIG. 7(d) output from the comparator 62 has a pulse width outputting "H" that varies depending on the value of the difference voltage dV.

The AND gate 6 outputs, as a pulse control signal shown in FIG. 7(e), the logical AND of the clock pulse of the fixed time cycle TC output from the oscillator 7 and the pulse waveform output from the comparator 62. Due to the pulse waveform that varies depending on the value of the difference voltage dV, the pulse width of the "H" pulse control signal also lengthens or shortens depending on the value of the difference voltage dV.

While the "H" pulse control signal is being output, ON control of the switching device 3 is executed. Accordingly, the ON time T1 is controlled in accordance with the value of the difference voltage dV. In other words, if a positive difference voltage dV is input, the pulse width of the "H" pulse control signal shortens in accordance with the value thereof, and the ON time T1 is controlled to be shorter. On the other hand, if a negative difference voltage dV is input, the pulse width of the "H" pulse control signal lengthens in accordance with the value thereof, and the ON time T1 is controlled to be longer.

In each of the above described embodiments, in the case that the constant voltage control is executed for the output voltage $V_{2o}$ of the rectifying smoothing circuits 4 and 13, as of the output time T2 is not constant from beginning of the oscillation operation until stable operation of the entire switching power supply circuit, the set voltage $V_{2aset}'$ of the Equation (2) cannot be detected. Accordingly, until stable operation occurs, it is preferable that the ON time T1 is fixed, without adding the difference voltage dV to the voltage drop $V_{ip}$.

In addition, the above described constant voltage control does not necessarily have to be executed for each cycle of the time cycle Tc, and may be executed with a time cycle that is different, for example, longer, than the oscillation time cycle Tc.

Furthermore, according to the present invention, in the case that the output voltage exceeds a set reference voltage value, the voltage is reduced. However, the present invention is not limited to this, and if the output voltages of the secondary output winding 2b and the rectifying smoothing circuits 4 and 13 are set as $V_{2b}$ and $V_{2o}$, respectively, the set output voltage can be obtained. Accordingly, it is possible to apply and utilize the present invention with switching power supply circuits which have an output detection circuit on the secondary side of the transformer 2, and which are provided with a feedback circuit that transmits the detection signal thereof to the primary side via an insulated signal transmission element such as a photocoupler, or the like, in a similar manner to the conventional example.

Further, the elements enclosed within the dashed line U shown in the figures for the above described switching power supply circuits 10, 50 and 60 can be integrated as a single chip circuit component that executes input and output via analogue input terminals Vcc, Vd and Id.

What is claimed is:

1. A constant voltage output control method for a switching power supply circuit having a transformer provided with a primary winding and a secondary output winding; an oscillating switching device which is connected in-series with the primary winding to a direct current power supply that excites the primary winding; a switching control circuit that executes ON/OFF control of the oscillating switching device; and a rectifying smoothing circuit that rectifies and smoothes an output of the secondary output winding; this constant voltage output control method executing a constant voltage control of an output voltage $V_{2b}$ that is generated in the secondary output winding by changing an ON time T1 of the oscillating switching device of the switching power supply circuit, comprising the steps of:

deriving a set voltage $V_{2aset}$ based on equation (1), $$V_{2aset} = Np \div Ns \times V_{2bset} \qquad (1)$$

where, $V_{2bset}$ represents an output voltage of the secondary output winding that is subject to the constant voltage control, Np represents a number of turns of the primary winding, and Ns represents a number of turns of the secondary output winding;

comparing the set voltage $V_{2aset}$ with a flyback voltage $V_{2a}$ of the primary winding; and executing at least one of a time shortening control and a time lengthening control such that, in the case that the flyback voltage $V_{2a}$ is more than the set voltage $V_{2aset}$, the time shortening control is executed that shortens the ON time T1 of the oscillating switching device in accordance with a difference voltage dV between the set voltage $V_{2aset}$ and the flyback voltage $V_{2a}$, and in the case that the flyback voltage $V_{2a}$ is less than the set voltage $V_{2aset}$, the time lengthening control is executed that lengthens the ON time T1 of the oscillating switching device in accordance with the difference voltage dV.

2. A constant voltage output control method for a switching power supply circuit having a transformer provided with a primary winding and a secondary output winding; an oscillating switching device which is connected in-series with the primary winding to a direct current power supply that excites the primary winding; a switching control circuit that executes ON/OFF control of the oscillating switching device; and a rectifying smoothing circuit that rectifies and smoothes an output of the secondary output winding; this constant voltage output control method executing a constant voltage control of an output voltage $V_{2o}$ of the rectifying smoothing circuit by changing an ON time T1 of the oscillating switching device of the switching power supply circuit, comprising the steps of:

deriving a set voltage $V_{2aset}'$ based on equation (2), $$V_{2aset}' = V_{2oset} \times Np \div Ns \div (1 - T2 \times k \div Ls) \qquad (2)$$

where, $V_{2oset}$ represents an output voltage of the rectifying smoothing circuit that is subject to the constant voltage control, Np represents a number of turns of the primary winding, Ns represents a number of turns of the secondary output winding, Ls represents an inductance of the secondary output winding, T2 represents an output time for which output is generated in the rectifying smoothing circuit within an oscillation time cycle Tc, and k represents a proportionality constant provided dividing a forward voltage drop of a diode of the rectifying smooth circuit by an output current;

comparing the set voltage $V_{2aset}'$ with a flyback voltage $V_{2a}$ of the primary winding; and executing at least one of a time shortening control and a time lengthening control such that, in the case that the flyback voltage $V_{2a}$ is more than the set voltage $V_{2aset}'$, the time shortening control is executed that shortens the ON time T1 of the oscillating switching device in accordance with a difference voltage dV between the set voltage $V_{2aset}'$ and the flyback voltage $V_{2a}$, and in the case that the flyback voltage $V_{2a}$ is less than the set voltage $V_{2aset}'$, the time lengthening control is executed that lengthens the ON time T1 of the oscillating switching device in accordance with the difference voltage dV.

3. A constant voltage output control method for a switching power supply circuit having a transformer provided with a primary winding and an auxiliary winding on a primary side and a secondary output winding on a secondary side; an oscillating switching device which is connected in-series with the primary winding to a direct current power supply that excites the primary winding; a switching control circuit that executes ON/OFF control of the oscillating switching device; and a rectifying smoothing circuit that rectifies and smoothes an output of the secondary output winding; this constant voltage output control method executing a constant voltage control of an output voltage $V_{2b}$ that is generated in the secondary output winding by changing an ON time T1 of the oscillating switching device of the switching power supply circuit, comprising the steps of:

deriving a set voltage $V_{2cset}$ based on equation (3), $$V_{2cset} = Nt \div Ns \times V_{2bset} \qquad (3)$$

where, $V_{2bset}$ represents an output voltage of the secondary output winding that is subject to the constant voltage control, Nt represents a number of turns of the auxiliary winding, and Ns represents a number of turns of the secondary output winding;

comparing the set voltage $V_{2cset}$ with a flyback voltage $V_{2c}$ of the auxiliary winding; and executing at least one of a time shortening control and a time lengthening control such that, in the case that the flyback voltage $V_{2c}$ is more than the set voltage $V_{2cset}$, the time shortening control is executed that shortens the ON time T1 of the oscillating switching device in accordance with a difference voltage dV between the set voltage $V_{2cset}$, and the flyback voltage $V_{2c}$, and in the case that the flyback voltage $V_{2c}$ is less than the set voltage $V_{2cset}$, the time lengthening control is executed that lengthens the ON time T1 of the oscillating switching device in accordance with the difference voltage dV.

4. A constant voltage output control method for a switching power supply circuit having a transformer provided with a primary winding and an auxiliary winding on a primary side and a secondary output winding on a secondary side; an oscillating switching device which is connected in-series with the primary winding to a direct current power supply that excites the primary winding; a switching control circuit that executes ON/OFF control of the oscillating switching device; and a rectifying smoothing circuit that rectifies and smoothes an output of the secondary output winding; this constant voltage output control method executing a constant voltage control of an output voltage $V_{2o}$ that is generated in the rectifying smoothing circuit by changing an ON time T1 of the switching power supply circuit, comprising the steps of:

deriving a set voltage $V_{2cset}'$ based on equation (4), $$V_{2cset}'=V_{2oset} \times Nt \div Ns \div (1-T2 \times k \div Ls) \qquad (4)$$

where, $V_{2oset}$ represents an output voltage of the rectifying smoothing circuit that is subject to the constant voltage control, Nt represents a number of turns of the auxiliary winding, Ns represents a number of turns of the secondary output winding, Ls represents an inductance of the secondary output winding, T2 represents an output time for which output is generated in the rectifying smoothing circuit within an oscillation time cycle Tc, and k represents a proportionality constant provided dividing a forward voltage drop of a diode of the rectifying smooth circuit by an output current;

comparing the set voltage $V_{2cset}'$ with a flyback voltage $V_{2c}$ of the auxiliary winding; and executing at least one of a time shortening control and a time lengthening control such that, in the case that the flyback voltage $V_{2c}$ is more than the set voltage $V_{2cset}'$, the time shortening control is executed that shortens the ON time T1 of the oscillating switching device in accordance with a difference voltage dV between the set voltage $V_{2cset}'$ and the flyback voltage $V_{2c}$, and in the case that the flyback voltage $V_{2c}$ is less than the set voltage $V_{2cset}'$, the time lengthening control is executed that lengthens the ON time T1 of the oscillating switching device in accordance with the difference voltage dV.

5. The constant voltage output control method for a switching power supply circuit according to claim 2 wherein the output time T2 for which output is generated in the rectifying smoothing circuit during the oscillation time cycle Tc is detected based on a time from when flyback voltage is generated in the primary winding until when a first polarity reversal occurs.

6. The constant voltage output control method for a switching power supply circuit according to claim 2 wherein the output time T2 for which output is generated in the rectifying smoothing circuit during the oscillation time cycle Tc is detected based on a time from when flyback voltage is generated in the auxiliary winding of the transformer until when a first polarity reversal occurs.

7. The constant voltage output control method for a switching power supply circuit according to claim 4 wherein the output time T2 for which output is generated in the rectifying smoothing circuit during the oscillation time cycle Tc is detected based on a time from when flyback voltage is generated in the primary winding until when a first polarity reversal occurs.

8. The constant voltage output control method for a switching power supply circuit according to claim 4 wherein the output time T2 for which output is generated in the rectifying smoothing circuit during the oscillation time cycle Tc is detected based on a time from when flyback voltage is generated in the auxiliary winding of the transformer until when a first polarity reversal occurs.

9. A constant voltage output control device for a switching power supply circuit having a transformer provided with a primary winding and a secondary output winding; an oscillating switching device which is connected in-series with the primary winding to a direct current power supply that excites the primary winding; a primary side current detection portion that indicates a primary winding current Ip flowing in the primary winding based on a voltage drop $V_{ip}$ of an Ip detection resistor, this Ip detection resistor having a resistance value $r_{ip}$ and being connected in-series with the primary winding; a switching control circuit that executes ON control of the oscillating switching device with a predetermined time cycle, and executes OFF control of the oscillating switching device when the primary winding current Ip reaches a maximum current $Ip_{max}$ which is taken to occur when the voltage drop $V_{ip}$ reaches a maximum voltage $V_{iMax}$ that is the multiple of a maximum current $Ip_{max}$ and the resistance value $r_{ip}$; and a rectifying smoothing circuit that rectifies and smoothes an output of the secondary output winding; this constant voltage output control device executing a constant voltage control of an output voltage $V_{2b}$ that is generated in the secondary output winding by changing an ON time T1 of the oscillating switching device, comprising:

a voltage monitoring portion that detects a flyback voltage $V_{2a}$ of the primary winding;

a difference voltage generation circuit which obtains a set voltage $V_{2aset}$ based on equation (1), $$V_{2aset}=Np \div Ns \times V_{2bset} \qquad (1)$$

where, $V_{2bset}$ represents an output voltage of the secondary output winding that is subject to the constant voltage control, Np represents a number of turns of the primary winding, and Ns represents a number of turns of the secondary output winding, and which outputs a difference voltage dV expressed by equation (5), $$dV=V_{2a}-V_{2aset} \qquad (5)$$

which is based on the set voltage $V_{2aset}$ and the flyback voltage $V_{2a}$ of the primary winding; and an adder circuit that sets a correction voltage drop $V_{ip}'$ by adding the difference voltage dV to the voltage drop $V_{ip}$, wherein the switching control circuit sets the correction voltage drop $V_{ip}'$ as the voltage drop $V_{ip}$ that is compared with the maximum voltage $V_{iMax}$, and executes at least one of a time shortening control and a time lengthening control such that, in the case that the flyback voltage $V_{2q}$ is more than the set voltage $V_{2aset}$, the time shortening control is executed that shortens the ON time T1 of the oscillating switching device in accordance with the difference voltage dV, and in the case that the flyback voltage $V_{2a}$ is less than the set voltage $V_{2aset}$, the time lengthening control is executed that lengthens the ON time T1 of the oscillating switching device in accordance with the difference voltage dV.

10. A constant voltage output control device for a switching power supply circuit having a transformer provided with a primary winding and a secondary output winding; an oscillating switching device which is connected in-series with the primary winding to a direct current power supply that excites the primary winding; a primary side current detection portion that indicates a primary winding current Ip flowing in the primary winding based on a voltage drop $V_{ip}$ of an Ip detection resistor, this Ip detection resistor having a resistance value $r_{ip}$ and being connected in-series with the primary winding; a switching control circuit that executes ON control of the oscillating switching device with a predetermined time cycle, and executes OFF control of the oscillating switching device when the primary winding current Ip reaches a maximum current $Ip_{max}$ which is taken to occur when the voltage drop $V_{ip}$ reaches a maximum voltage $V_{imax}$ that is the multiple of a maximum current $Ip_{max}$ and the resistance value $r_{ip}$; and a rectifying smoothing circuit that rectifies and smoothes an output of the secondary output winding; this constant voltage output control device executing a constant voltage control of an output voltage $V_{2o}$ of the rectifying smoothing circuit by changing an ON time T1 of the oscillating switching device, comprising:

a voltage monitoring portion that detects a flyback voltage $V_{2a}$ of the primary winding;

an output time detection portion that detects an output time T2 for which output is generated in the rectifying smoothing circuit during an oscillation time cycle Tc;

a difference voltage generation circuit which obtains a set voltage $V_{2aset}'$ based on equation (2), $$V_{2aset}' = V_{2oset} \times Np \div Ns \div (1 - T2 \times k \div Ls) \tag{2}$$

where, $V_{2oset}$ represents an output voltage of the rectifying smoothing circuit that is subject to the constant voltage control, Np represents a number of turns of the primary winding, Ns represents a number of turns of the secondary output winding, Ls represents an inductance of the secondary output winding, T2 represents the output time for which output is generated in the rectifying smoothing circuit within the oscillation time cycle Tc, and k represents a proportionality constant provided dividing a forward voltage drop of a diode of the rectifying smooth circuit by an output current, and which outputs a difference voltage dV expressed by equation (6)

$$dV = V_{2a} - V_{2aset}' \tag{6}$$

which is based on the set voltage $V_{2aset}'$ and the flyback voltage $V_{2a}$ of the primary winding; and an adder circuit that sets a correction voltage drop $V_{ip}'$ by adding the difference voltage dV to the voltage drop $V_{ip}$, wherein the switching control circuit sets the correction voltage drop $V_{ip}'$ as the voltage drop $V_{ip}$ that is compared with the maximum voltage $V_{iMax}$, and executes at least one of a time shortening control and a time lengthening control such that, in the case that the flyback voltage $V_{2a}$ is more than the set voltage $V_{2aset}'$, the time shortening control is executed that shortens the ON time T1 of the oscillating switching device in accordance with the difference voltage dV, and in the case that the flyback voltage $V_{2a}$ is less than the set voltage $V_{2aset}'$, the time lengthening control is executed that lengthens the ON time T1 of the oscillating switching device in accordance with the difference voltage dV.

11. The constant voltage output control device for a switching power supply circuit according to claim 9, further comprising a maximum voltage $V_{imax}'$ is derived from equation (8)

$$V_{iMax}' = V_{iMax} - \delta t \times Vcc \div Lp \times r_{ip} \tag{8}$$

where, δt is a time difference between detection of the drop voltage $V_{ip}$, to which the difference voltage dV has been added, reaching the maximum voltage $V_{imax}$ and stopping of ON control of the oscillating switching device, Vcc represents a power supply voltage of the direct current power supply, and Lp represents an inductance of the primary winding, and the switching control circuit sets this maximum voltage $V_{imax}'$ as the maximum voltage $V_{imax}$ that is compared with the correction voltage drop $V_{ip}'$.

12. The constant voltage output control device for a switching power supply circuit according to claim 10, further comprising a maximum voltage $V_{imax}'$ is derived from equation (8), $$V_{iMax}' = V_{iMax} - \delta t \times Vcc \div Lp \times r_{ip} \tag{8}$$

where, δt is a time difference between detection of the drop voltage $V_{ip}$, to which the difference voltage dV has been added, reaching the maximum voltage $V_{imax}$ and stopping of ON control of the oscillating switching device, Vcc represents a power supply voltage of the direct current power supply, and Lp represents an inductance of the primary winding, and the switching control circuit sets this maximum voltage $V_{imax}'$ as the maximum voltage $V_{imax}$ that is compared with the correction voltage drop $V_{ip}'$.

13. The constant voltage output control device for a switching power supply circuit according to claim 9, wherein when the difference voltage dV output from the difference voltage generation circuit exceeds a permitted maximum difference voltage $dV_{LIM}$, the difference voltage dV is set to the permitted maximum difference voltage $dV_{LIM}$.

14. The constant voltage output control device for a switching power supply circuit according to claim 10, wherein when the difference voltage dV output from the difference voltage generation circuit exceeds a permitted maximum difference voltage $dV_{LIM}$, the difference voltage dV is set to the permitted maximum difference voltage $dV_{LIM}$.

15. The constant voltage output control device for a switching power supply circuit according to claim 13, wherein in the case that the voltage drop $V_{ip}$ does not reach a minimum potential $V_{imin}$ expressed by equation (7), $$V_{imin} = V_{imax} - dV_{LIM} \tag{7}$$

ON control of the oscillating switching device is temporarily stopped.

16. The constant voltage output control device for a switching power supply circuit according to claim 13, further comprising a maximum voltage $V_{imax}'$ is derived from equation (8), $$V_{iMax}'=V_{iMax}-\delta t\times Vcc\div Lp\times r_{ip} \tag{8}$$

where, $\delta t$ is a time difference between detection of the drop voltage $V_{ip}$, to which the difference voltage dV has been added, reaching the maximum voltage $V_{imax}$ and stopping of ON control of the oscillating switching device, Vcc represents a power supply voltage of the direct current power supply, and Lp represents an inductance of the primary winding, and the switching control circuit sets this maximum voltage $V_{imax}'$ as the maximum voltage $V_{imax}$ that is compared with the correction voltage drop $V_{ip}'$.

17. A constant voltage output control device for a switching power supply circuit having a transformer provided with a primary winding and a secondary output winding; an oscillating switching device which is connected in-series with the primary winding to a direct current power supply that excites the primary winding; an oscillator circuit that generates a pulse control signal with a fixed time cycle Tc, a single cycle of the fixed time cycle Tc being formed by respective output periods of a first level and a second level continuous with the first level; a switching control circuit that executes ON control of the oscillating switching device while the pulse control signal is the first level, and executes OFF control of the oscillating switching device while the pulse control signal is the second level; and a rectifying smoothing circuit that rectifies and smoothes an output of the secondary output winding; this constant voltage output control device executing a constant voltage control of an output voltage $V_{2b}$ that is generated in the secondary output winding by changing an ON time T1 of the oscillating switching device, comprising:

a primary side current detection portion that indicates a primary winding current Ip flowing in the primary winding based on a voltage drop $V_{ip}$ of an Ip detection resistor, this Ip detection resistor having a resistance value $r_{ip}$ and being connected in-series with the primary winding;

a voltage monitoring portion that detects a flyback voltage $V_{2a}$ of the primary winding;

a difference voltage generation circuit which obtains a set voltage $V_{2aset}$ based on equation (1), $$V_{2aset}=Np\div Ns\times V_{2bset} \tag{1}$$

where, $V_{2bset}$ represents an output voltage of the secondary output winding that is subject to the constant voltage control, Np represents a number of turns of the primary winding, and Ns represents a number of turns of the secondary output winding, and which outputs a difference voltage dV expressed by equation (5), $$dV=V_{2a}-V_{2aset} \tag{5}$$

which is based on the set voltage $V_{2aset}$ and the flyback voltage $2a$ of the primary winding; and a pulse width modulation circuit that executes pulse width modulation of a pulse width of the first level of the pulse control signal using the difference voltage dV, wherein the switching control circuit executes at least one of a time shortening control and a time lengthening control such that, in the case that the flyback voltage $V_{2a}$ is more than the set voltage $V_{2aset}$, the time shortening control is executed that shortens the ON time T1 of the oscillating switching device in accordance with the difference voltage dV, and in the case that the flyback voltage $V_{2a}$ is less than the set voltage $V_{2aset}$, the time lengthening control is executed that lengthens the ON time T1 of the oscillating switching device in accordance with the difference voltage dV.

18. A constant voltage output control device for a switching power supply circuit having a transformer provided with a primary winding and a secondary output winding; an oscillating switching device which is connected in-series with the primary winding to a direct current power supply that excites the primary winding; an oscillator circuit that generates a pulse control signal with a fixed time cycle Tc, a single cycle of the fixed time cycle Tc being formed by respective output periods of a first level and a second level continuous with the first level; a switching control circuit that executes ON control of the oscillating switching device while the pulse control signal is the first level, and executes OFF control of the oscillating switching device while the pulse control signal is the second level; and a rectifying smoothing circuit that rectifies and smoothes an output of the secondary output winding; this constant voltage output control device executing a constant voltage control of an output voltage $V_{2o}$ of the rectifying smoothing circuit by changing an ON time T1 of the oscillating switching device, comprising:

a primary side current detection portion that indicates a primary winding current Ip flowing in the primary winding based on a voltage drop $V_{ip}$ of an Ip detection resistor, this Ip detection resistor having a resistance value $r_{ip}$ and being connected in-series with the primary winding;

a voltage monitoring portion that detects a flyback voltage $V_{2a}$ of the primary winding;

an output time detection portion that detects an output time T2 for which output is generated in the rectifying smoothing circuit during an oscillation time cycle Tc;

a difference voltage generation circuit which obtains a set voltage $V_{2aset}'$ based on equation (2), $$V_{2aset}'=V_{2oset}\times Np\div Ns\div(1-T2\times k\div Ls) \tag{2}$$

where, $V_{2oset}$ represents an output voltage of the rectifying smoothing circuit that is subject to the constant voltage control, Np represents a number of turns of the primary winding, Ns represents a number of turns of the secondary output winding, Ls represents an inductance of the secondary output winding, T2 represents the output time for which output is generated in the rectifying smoothing circuit within the oscillation time cycle Tc, and k represents a proportionality constant provided dividing a forward voltage drop of a diode of the rectifying smooth circuit by an output current, and which outputs a difference voltage dV expressed by equation (6), $$dV=V_{2a}-V_{2aset}' \tag{6}$$

which is based on the set voltage $V_{2aset}'$ and the flyback voltage $2a$ of the primary winding; and a pulse width modulation circuit that executes pulse width modulation of a pulse width of the first level of the pulse control signal using the difference voltage dV, wherein the switching control circuit executes at least one of a time shortening control and a time lengthening control such that, in the case that the flyback voltage $V_{2a}$ is more than the set voltage $V_{2aset}'$, the time shortening control is executed that shortens the ON time T1 of the oscillating switching device in accordance with the difference voltage dV, and in the case that the flyback voltage $V_{2a}$ is less than the set voltage $V_{2aset}'$, the time lengthening control is executed that lengthens the ON time T1 of the oscillating switching device in accordance with the difference voltage dV.

19. The constant voltage output control device for a switching power supply circuit according to claim 17, wherein
when the difference voltage dV output from the difference voltage generation circuit exceeds a permitted maximum difference voltage $dV_{LIM}$, the difference voltage dV is set to the permitted maximum difference voltage $dV_{LIM}$.

20. The constant voltage output control device for a switching power supply circuit according to claim 18, wherein
when the difference voltage dV output from the difference voltage generation circuit exceeds a permitted maximum difference voltage $dV_{LIM}$, the difference voltage dV is set to the permitted maximum difference voltage $dV_{LIM}$.

21. The constant voltage output control device for a switching power supply circuit according to claim 10, further comprising:
a primary winding voltage monitoring circuit that monitors a voltage $V_{2a}$ of the primary winding, and detects a time from when flyback voltage is generated in the primary winding until when a first polarity reversal occurs, wherein
the time from when flyback voltage is generated in the primary winding until when the first polarity reversal occurs is taken as the output time T2.

22. The constant voltage output control device for a switching power supply circuit according to claim 18, further comprising:
a primary winding voltage monitoring circuit that monitors a voltage $V_{2a}$ of the primary winding, and detects a time from when flyback voltage is generated in the primary winding until when a first polarity reversal occurs, wherein
the time from when flyback voltage is generated in the primary winding until when the first polarity reversal occurs is taken as the output time T2.

23. The constant voltage output control device for a switching power supply circuit according to claim 10, further comprising:
an auxiliary winding that is additionally provided at a primary side of the transformer; and
an auxiliary winding voltage monitoring circuit that monitors a voltage $V_{2c}$ of the auxiliary winding, and detects a time from when flyback voltage is generated in the auxiliary winding until when a first polarity reversal occurs, wherein
the time from when flyback voltage is generated in the primary winding until when the first polarity reversal occurs is taken as the output time T2.

24. The constant voltage output control device for a switching power supply circuit according to claim 18, further comprising:
an auxiliary winding that is additionally provided at a primary side of the transformer; and
an auxiliary winding voltage monitoring circuit that monitors a voltage $V_{2c}$ of the auxiliary winding, and detects a time from when flyback voltage is generated in the auxiliary winding until when a first polarity reversal occurs, wherein
the time from when flyback voltage is generated in the primary winding until when the first polarity reversal occurs is taken as the output time T2.

* * * * *